US012790563B2

(12) United States Patent
Eady et al.

(10) Patent No.: US 12,790,563 B2
(45) Date of Patent: *Nov. 10, 2026

(54) TUNING SULFONATION AND CONTROLLING OLEO-FURAN SURFACTANT COMPOSITIONS

(71) Applicant: SIRONIX RENEWABLES, INC., Seattle, WA (US)

(72) Inventors: Shawn Eady, Collegeville, PA (US); Tyler Robison, Seattle, WA (US); Michelle Cruz, Seattle, WA (US); Trenton Wilke, Seattle, WA (US); Sabrina Conrad, Seattle, WA (US); Maryam Ansari, Seattle, WA (US); Christoph Krumm, San Francisco, CA (US)

(73) Assignee: SIRONIX RENEWABLES, INC., Seattle, WA (US)

( * ) Notice: Subject to any disclaimer, the term of this patent is extended or adjusted under 35 U.S.C. 154(b) by 420 days.

This patent is subject to a terminal disclaimer.

(21) Appl. No.: 18/490,418

(22) Filed: Oct. 19, 2023

(65) Prior Publication Data

US 2024/0060006 A1 Feb. 22, 2024

Related U.S. Application Data

(63) Continuation of application No. 18/060,673, filed on Dec. 1, 2022.

(60) Provisional application No. 63/388,872, filed on Jul. 13, 2022, provisional application No. 63/288,256, filed on Dec. 10, 2021.

(51) Int. Cl.
*C11D 1/26* (2006.01)

(52) U.S. Cl.
CPC .................................... *C11D 1/26* (2013.01)

(58) Field of Classification Search
CPC ....................................................... C11D 1/26
USPC ........................................................ 510/495
See application file for complete search history.

(56) References Cited

U.S. PATENT DOCUMENTS

| | | | |
|---|---|---|---|
| 2,411,567 | A | 11/1946 | Wotherspoon |
| 4,443,559 | A | 4/1984 | Smith, Jr. |
| 4,477,382 | A | 10/1984 | Goel et al. |
| 5,338,517 | A | 8/1994 | Evans, III et al. |
| 5,387,705 | A | 2/1995 | Stipp et al. |
| 5,776,320 | A | 7/1998 | Marion et al. |
| 6,149,879 | A | 11/2000 | Forestiere et al. |
| 6,416,659 | B1 | 7/2002 | Groten et al. |
| 2004/0260137 | A1 | 12/2004 | Elomari et al. |
| 2014/0135359 | A1 | 5/2014 | Martineau |
| 2015/0150768 | A1 | 6/2015 | West et al. |
| 2015/0166596 | A1 | 6/2015 | Hill |
| 2016/0304479 | A1 | 10/2016 | Stensrud |
| 2017/0226075 | A1 | 8/2017 | Stensrud et al. |
| 2018/0051113 | A1 | 2/2018 | Yang et al. |
| 2018/0327375 | A1 | 11/2018 | Krumm et al. |
| 2020/0308475 | A1 | 10/2020 | Recio, III et al. |
| 2023/0183604 | A1 * | 6/2023 | Eady ........................ C11D 1/26 510/495 |

FOREIGN PATENT DOCUMENTS

| | | | |
|---|---|---|---|
| CN | 104162447 | B | 11/2017 |
| WO | 9627580 | A1 | 9/1996 |
| WO | 2017079718 | A1 | 5/2017 |
| WO | 2017079719 | A1 | 5/2017 |
| WO | 2020040389 | A1 | 2/2020 |

OTHER PUBLICATIONS

Brown et al., "The Condensation of Furan and Sylvan with Some Carbonyl Compounds," Canadian Journal of Chemistry, vol. 34, No. 9, Sep. 1956, pp. 11471153.
Ackman et al., "Ozonolysis of Unsaturated Fatty Acids I. Ozonolysis of Oleic Acid," Canadian Journal of Chemistry, vol. 39, No. 10, 1961, pp. 1956-1963.
Kadesch, "Ozonolysis of Fatty Acids and Their Derivatives," Progress in the Chemistry of Fats and other Lipids vol. 6, 1963, pp. 291312.
Iovel et al., "Hydroxymethylation of Furan and its Derivatives in the Presence of Cation-Exchange Resins," Journal of Molecular Catalysis, vol. 57, No. 1, 1989, pp. 91103.
Ben-Daniel et al., "Selective Aerobic Oxidation of Alcohols with a Combination of a Polyoxometalate and Nitroxyl Radical as Catalysts," Journal of Organic Chemistry, vol. 66, No. 25, Nov. 2001, pp. 86508653.
Kan et al., "Catalytic oxidation of a-eicosanol into eicosanic acid in the presence of Ti-MCM-41 or active component supported Ti-MCM-41 catalysts," Microporous and Mesoporous Materials, vol. 4445, Apr. 2001, pp. 609-617.
Gheneim et al., "Diels-Alder reactions with novel polymeric dienes and dienophiles: synthesis of reversibly cross-linked elastomers," Macromolecules, vol. 35, No. 19, Aug. 8, 2002, pp. 72467253, Abstract Only.
Shi et al., "AuPd nanoparticles on layered double hydroxide: Highly active catalyst for aerobic oxidation of alcohols in aqueous phase," Catalysis Communications, vol. 18, Feb. 2002, pp. 142-146.
Travis et al., "Osmium Tetroxide-Promoted Catalytic Oxidative Cleavage of Olefins: An Organometallic Ozonolysis," Journal of the American Chemical Society, vol. 124, No. 9, 2002, pp. 3824-3825.
Yow et al., "Hydrolysis of palm olein catalyzed by solid heteropolyacids," Journal of the American Oil Chemists' Society, vol. 79, 2002, pp. 357-361.

(Continued)

*Primary Examiner* — Kristin A Vajda

(74) *Attorney, Agent, or Firm* — Fredrikson & Byron, P.A.

(57) ABSTRACT

Disclosed herein are methods for sulfonation of oleo-furan compounds derived from a furan moiety and either an individual fatty acid or a mixture of fatty acids representative of those yielded from one or more plant oils. Additionally, this disclosure describes tuning sulfonation conditions to produce oleo-furan sulfonate blends which can demonstrate beneficial surfactant characteristics and improvements in various applications.

20 Claims, 9 Drawing Sheets

(56) References Cited

OTHER PUBLICATIONS

Hong et al., "Selective oxidation of octadecan-1-ol to octadecanoic acid over Co3O4/SiO2 catalysts," Reaction Kinetics and Catalysis Letters, vol. 81, Jan. 2004, pp. 1320.

Dorwald et al., "Side reactions in Organic Synthesis," Wiley: VCH Weinheim Preface, pp. 1-15 and Chapter 8, pp. 279-308. (Year: 2005).

Pubchem. CID 68119, Retrieved from the Internet <https://pubchem.ncbi.nlm.nih.gov/compound/68119>, Mar. 26, 2005, pp. 1-19.

Corma, A., Iborra, S., & Velty, A. (2007). Chemical routes for the transformation of biomass into chemicals. Chemical reviews, 107(6), 2411-2502.

Pubchem. CID 54467179, Retrieved from the Internet <https://pubchem.ncbi.nlm.nih.gov/compound/54467179>, Dec. 4, 2011, pp. 1-6.

Engel et al., "Thermoreversible reactions on inorganic nanoparticle surfaces: Diels-Alder reactions on sterically crowded surfaces," Chemistry of Materials, vol. 25, Dec. 12, 2012, pp. 149-157.

Saedi et al., "MIL-101 metalorganic framework: A highly efficient heterogeneous catalyst for oxidative cleavage of alkenes with H2O2," Catalysis Communications, vol. 17, Jan. 5, 2012, pp. 18-22.

Sakuth et al., "Reactive Distillation," Ullmanns Encyclopedia of Industrial Chemistry, Jan. 1, 2012, Wiley-VCH, Weinheim, pp. 263276.

Gandini, "The furan/maleimide DielsAlder reaction: A versatile clickunclick tool in macromolecular synthesis," Progress in Polymer Science, vol. 38, No. 1, Jan. 2013, pp. 129, Abstract Only.

Xie et al., "Preparation of Methyl Ester Sulfonates Based on Sulfonation in a Falling Film Microreactor from Hydrogenated Palm Oil Methyl Esters with Gaseous SO3," Industrial & Engineering Chemistry Research, vol. 52, 2013, pp. 37143722.

Corberan et al., "Green oxidation of fatty alcohols: Challenges and opportunities," Applied Catalysis A: General, vol. 474, Mar. 2014, pp. 211223.

Pubmed Compound Record for CID 75388835, 'Methyl 4-[(3,5-dimethylphenoxy)sulfonyl]-5-methylfuran-2-carboxylate', U.S. National Library of Medicine, Jul. 12, 2014, pp. 1-9 (https://pubchem.ncbi.nlm.nih.gov/compound/75388835).

Saha et al., "Advances in 5-hydroxymethylfurfural production from biomass in biphasic solvents," Green Chemistry, vol. 16, 2014, pp. 2438.

Trubyanov et al., "High-pressure distillation: Simultaneous impact of pressure, temperature and loading on separation performance during distillation of high-purity gases in high-performance randomly-packed columns," Separation and Purification Technology, vol. 135, Oct. 2014, pp. 117-126.

Froidevaux et al, "Study of the Diels-Alder and retro-Diels-Alder reaction between furan derivatives and maleimide for the creation of new materials," RSC Advances, vol. 5, 2015, pp. 3774237754, Abstract Only.

Bidange et al., "Ethenolysis: A Green Catalytic Tool to Cleave CarbonCarbon Double Bonds," Chemistry A European Journal, vol. 22, No. 35, Aug. 22, 2016, pp. 12226-12244.

Byrne et al., "Tools and techniques for solvent selection: green solvent selection guides," Sustainable Chemical Processes, vol. 4, No. 7, 2016, 24 pages.

Park et al., "Tunable Oleo-Furan Surfactants by Acylation of Renewable Furans," ACS Central Science, vol. 2, Issue 11, Oct. 19, 2016, pp. 820-824.

Lundin et al., "Intensified and Safe Ozonolysis of Fatty Acid Methyl Esters in Liquid CO2 in a Continuous Reactor," AIChE Journal, vol. 63, No. 7, 2017, pp. 28192826.

Xu et al., "Trialkylphosphine-Mediated Synthesis of 2-Acyl Furans from Ynenones," Organic Letters, vol. 19, Jun. 27, 2017, pp. 3556-3559.

Almqvist, "Furans from biomass: Production, applications and techno economic potential," Processum, Apr. 20, 2018, 9 pages.

Joseph, "Tunable Synthesis and Characterization of Oleo-Furan Sulfonate Surfactants from Renewable Furan and Fatty Acids," Dissertation submitted to the Faculty of University of Minnesota, May 2018, pp. 1-154.

Liang et al., "Acid-Catalyzed Ring Opening of Furan in Aqueous Solution," Energy Fuels, vol. 32, No. 4, 2018, pp. 41394148.

Liu et al., "Molybdenum Oxide-Modified Iridium Catalysts for Selective Production of Renewable Oils for Jet and Diesel Fuels and Lubricants," ACS Catalysis, vol. 9, Jul. 16, 2019, pp. 7679-7689.

Naik et al., "Liquid phase acylation of 2-methylfuran with fatty acid anhydride," NAM 26, 2019 North American Catalysis Society Meeting, Jun. 26, 2019, 3 pages.

Pubchem, Compound Summary for SID 150925859, Modify Date: Jun. 3, 2019 [retrieved on Apr. 13, 2021]. Retrieved from the Internet: <URL: https://pubchem.ncbi.nlm.nih.gov/substance/150925859>, 7 pages.

Vauthier et al., "Interfacial Diels-Alder reaction between furan-functionalized polymer coatings and maleimide-terminated poly-(ethylene glycol)," The Journal of Physical Chemistry C, vol. 123, Jan. 22, 2019, pp. 4125-4132.

International Patent Application No. PCT/US2022/080722, International Search Report and Written Opinion mailed May 1, 2023, 10 pages.

International Patent Application No. PCT/US2022/080722, Invitation to Pay Additional Fees mailed Feb. 17, 2023, 3 pages.

Pubmed Compound Record for CID 14421037, '2-Ethyl-5-hexylfuran-3-sulfonic acid', U.S. National Library of Medicine, Feb. 9, 2007, retrieved from https://pubchem. ncbi .nlm.nih.gov/compound/14421037, 10 pages.

Pubmed Compound Record for CID 13090063, '4-Sulfo-5-methylfuran-2-carboxylic acid', U.S. National Library of Medicine, Feb. 8, 2007, pp. 1-10 (https://pubchem.ncbi.nlm.nih.gov/compound/13090063).

Database Registry Chemical Abstracts Service, Columbus, Ohio, Accession No. RN 5447-79-0, Entered STN: Nov. 16, 1984.

Park et al., "Supporting Information: Tunable Oleo-Furan Surfactants by Acylation of Renewable Furnas", ACS Central Science, vol. 2, Issue 11, Oct. 19, 2016, pp. S1-S90.

European Patent Office, "Extended European Search Report", From Application No. 22905249.3, Dated Mar. 3, 2026, pp. 6.

* cited by examiner

Sodium OMFS-Blend

Na 4-OMFS-12-1/O

Na α-OMFS-12-1/O

Na 4,α-OMFS-12-1/O

Calcium OMFS-Blend

Ca 4-OMFS-12-1/O

Ca α-OMFS-12-1/O

Ca 4,α-OMFS-12-1/O

Magnesium OMFS-Blend

Mg 4-OMFS-12-1/O

Mg α-OMFS-12-1/O

Mg 4,α-OMFS-12-1/O

Sodium OFS-Blend

Na 4-OFS-12-1/O Na α-OFS-12-1/O Na 4,α-OFS-12-1/O

TUNING SULFONATION AND CONTROLLING OLEO-FURAN SURFACTANT COMPOSITIONS

RELATED APPLICATIONS

This disclosure claims priority to U.S. application Ser. No. 18/060,673, filed on Dec. 1, 2022 which claims priority to U.S. Provisional Patent Application No. 63/288,256, filed on Dec. 10, 2021, and U.S. Provisional Patent Application No. 63/388,872, filed on Jul. 13, 2022, the contents of each of which are hereby being incorporated by reference.

TECHNICAL FIELD

This disclosure generally relates to surfactant compositions and related methods for synthesizing such surfactants. In particular, disclosed herein are embodiments including oleo-furan surfactant compositions and related methods for tuning sulfonation of oleo-furans and controlling oleo-furan surfactant compositions.

BACKGROUND

Surfactants are chemical compounds that have a variety of applications. Such applications can include household cleaners and detergents, institutional & industrial cleaning products, agricultural chemicals such as spray adjuvants, oilfield applications, and various coating additives. Short for surface active agent, a surfactant consists of a hydrophilic moiety, which attracts water, and a hydrophobic moiety, which attracts oil and dirt. The amphiphilic structure of surfactant molecules enables them to suspend dirt, emulsify, and modify surface properties of materials. Variations in the chemical structure of a surfactant molecule can enable tunable properties, such as emulsifying capability (hydrophilic/lipophilic balance), oil/dirt suspension capacity (critical micelle concentration), cold water performance (Krafft point), hard water tolerance (stability to calcium and magnesium ions), different types of foaming including pour and high shear, level of skin irritation, color, and biodegradation.

Commercially manufactured surfactants are generally synthesized entirely or in part from petrochemical feedstocks, such as long chain alkanes/alkenes and ethylene oxide. Emerging trends toward eco-friendly surfactants have shifted focus toward materials derived from renewable sources. Development has focused largely on replacing current petrochemical surfactants with bio-based analogues with identical chemical structure (e.g., sodium lauryl sulfate from petroleum and sodium coco sulfate from coconut oil).

Despite decades of development, nearly all surfactant structures are faced by a unified problem: the presence of hard water (containing calcium, magnesium, iron, etc.) inactivates surfactants. Inactivation causes surfactants to form solid precipitates and substantially lose function. Development of a new class of bio-based surfactants, called oleo-furan surfactants (OFS), can overcome the hard water inactivation challenge associated with prior surfactant structures, demonstrating 50-100 times greater calcium tolerance compared with other surfactants.

SUMMARY

Oleo-furan surfactants can be synthesized through a multi-step process involving hydrolysis of a triglyceride molecule to form fatty acids, dehydration of the fatty acids to form fatty acid anhydrides, and acylation of furan with a fatty acid anhydride. Subsequent steps can include optional reactions, such as reduction/hydrogenation of oxygen functionality or aldol condensation to incorporate chemical branched structures, as well as chemical modification of the furan moiety with sulfonates, sulfates, or other oxygen moieties to form a hydrophilic group. Between each reaction step there can be a purification step (e.g., distillation) to effectively separate out byproducts, solvents, and products.

The present disclosure describes embodiments of methods for sulfonation of oleo-furan compounds derived from a furan moiety and either an individual fatty acid or a mixture of fatty acids representative of those yielded from plant oils (e.g., coconut oil). Additionally, this disclosure describes embodiments where tuning the sulfonation conditions produces new, unique oleo-furan sulfonate blends which can demonstrate beneficial surfactant characteristics and improvements in various applications. Finally, the synergistic effects of oleo-furan sulfonate blends and improvements on individual surfactant properties are described with reference to the methods that provide more optimal surfactant selectivity.

The disclosed sulfonation method embodiments and the disclosed resulting surfactant mixture embodiments can be differentiated from previous oleo-furan surfactant synthesis processes because of a difference in chemical composition of these newly discovered surfactants as well as the expanded set of reaction conditions, including sulfonating agents, reagent loading, solvent selection, reaction temperature and reaction time that were tested for impact on surfactant preparation. Prior to the work that led to this disclosure, it was unknown that the position and number of sulfonate functional groups on the oleo-furan sulfonate surfactant molecules could be altered. As a result of the sulfonation techniques disclosed herein, method embodiments for precisely controlling the selectivity of oleo-furan sulfonation reactions have been elucidated, which allows for tuning reaction conditions to achieve high selectivity to a specific sulfonation position and/or number, or to achieve a specific ratio of different sulfonation positions/numbers that can achieve superior functional properties compared to individual oleo-furan surfactants. The method embodiments detailed below that enable control over the number of sulfonate groups per surfactant molecule notably allow for controlled alteration of the hydrophilic-lipophilic balance of a surfactant to achieve superior application performance with variable carbon content.

The embodiments disclosed herein can be applied in the chemicals industry, including production of consumer products, such as detergents, cleaners, and personal care products. Surfactant production is relevant to manufacturers who produce bulk surfactants, as well as formulators, who generate consumer products containing surfactants. In particular, a subset of the disclosed surfactant class has properties similar or superior to the commercial surfactant sodium laureth sulfate, while avoiding the likely carcinogenic compound 1,4-dioxane produced as a byproduct of sodium laureth sulfate synthesis.

Uses for surfactant compositions disclosed herein can include two primary product classes: (1) cleaning components, with formulations that include surfactants, builders, carriers, enzymes, alkalis, organic polymeric compounds, dyes/colorants, bleaches, alkanolamines, soil suspension agents, abrasives, fabric softening agents, fragrances, hydrotropes, opacifiers, preservatives, dispersants, processing aids, solvents, sud control agents, antimicrobial agents, anti-redeposition agents, and/or corrosion inhibitors, and (2) personal care products, with formulations that include surfactants, oils, emollients, moisturizers, carriers, extracts, vitamins, minerals, alkalis, anti-aging compounds, solvents, polymers, preservatives, antimicrobials, waxes, particles, colorants/dyes, abrasives, antimicrobial agents, opacifiers, processing aids, and/or fragrances.

Cleaning component formulations incorporating one or more surfactant compositions disclosed herein can take the form of liquid detergents, such as laundry, dishwashing, and hand dishwashing detergents, solid detergents, including powders, bars, and tablets, as well as industrial cleaners, hard surface cleaners, disinfectants, and decontaminants. Personal care product formulations incorporating one or more surfactant compositions disclosed herein can take the form of hair shampoos, conditioners, and treatments, as well as body wash, lotion, facial and body soap, foam bath, make-up removers, skin care products, acne control products, shaving aids, deodorants, antiperspirants, cosmetics, depilatory, and fragrances. Additional applications for surfactant embodiments disclosed herein can include agricultural chemicals (e.g., spray adjuvants, emulsifiers for pesticides/herbicides, spray tank additives, and drift reducers), oilfield applications (e.g., enhanced oil recovery, oil spill remediation), and paints/inks/coatings (e.g., emulsifiers, pigment stabilizers).

One exemplary embodiment includes a method of sulfonating an oleo-furan (OF) molecule or substituted oleo-furan molecule (e.g., oleo-methylfuran, OMF) via the following reaction scheme. Scheme 1:

Scheme 1

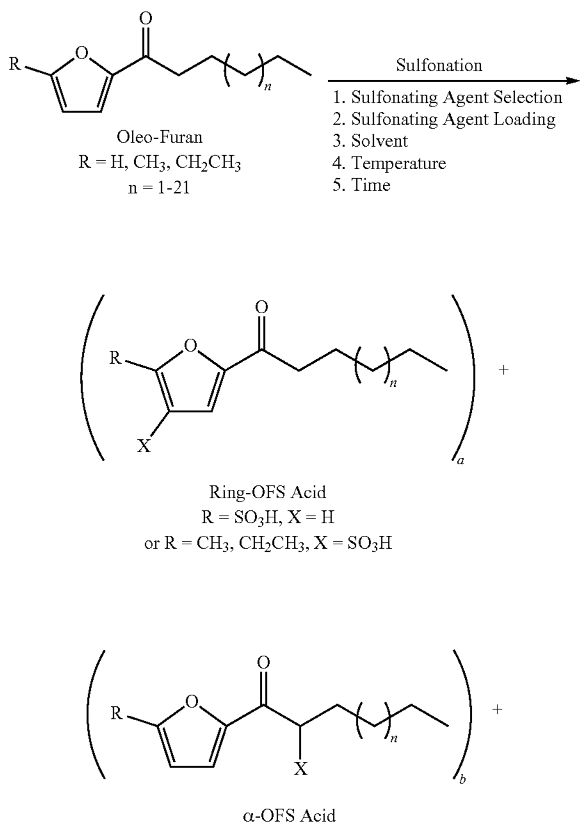

Oleo-Furan
R = H, $CH_3$, $CH_2CH_3$
n = 1-21

Ring-OFS Acid
R = $SO_3H$, X = H
or R = $CH_3$, $CH_2CH_3$, X = $SO_3H$

α-OFS Acid
R = H, X = X = $SO_3H$
or R = $CH_3$, $CH_2CH_3$, X = $SO_3H$

-continued

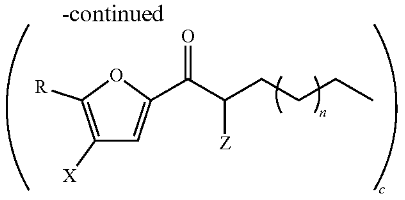

Ring, α-OFS Acid
R = $SO_3H$, X = H, Z = $SO_3H$
or R = $CH_3$, $CH_2CH_3$, X = $SO_3H$
Z = $SO_3H$ Scheme 1 illustrates sulfonation of oleo-furans to produce oleo-furan sulfonic acids with mole ratios a, b, and c, where tuning of noted reaction parameters 1-5 (sulfonating agent selection, sulfonating agent loading, solvent, temperature, and time) can be used to achieve controlled selectivity for different mole ratios of the compounds shown. Namely, various combinations of (1) sulfonating agent, (2) sulfonating agent loading, indicated by the molar ratio of sulfonating agent to oleo-furan added to the reaction mixture, (3) solvent used or absence thereof (neat), (4) temperature and (5) reaction time can provide selective formation of one or more oleo-furan sulfonic acids. Optional neutralization of the formed sulfonic acids with a base as illustrated in Scheme 2, below, can yield surfactant salts of General Structure 1(GS1), illustrated below. Schemes 1 and 2 illustrate the general sulfonation and neutralization processes that may utilize a number of oleo-furan feedstocks, including those with ring-substituted functional groups such as —H, —$CH_3$, —$CH_2CH_3$, a longer alkyl chain, —OH, —$SO_3$—, —$SO_3H$, or other functional groups, and 'n' designates a variable number of carbon atoms (n=1-21) that are part of an extended saturated or unsaturated alkyl chain with a total of 6-26 carbons in length, where the alkyl chain includes the carbon atom connected to the furan ring with an acyl group.

As noted, another exemplary embodiment includes a method that includes neutralization of oleo-furan sulfonic acids via the following exemplary reaction scheme, Scheme 2:

Scheme 2

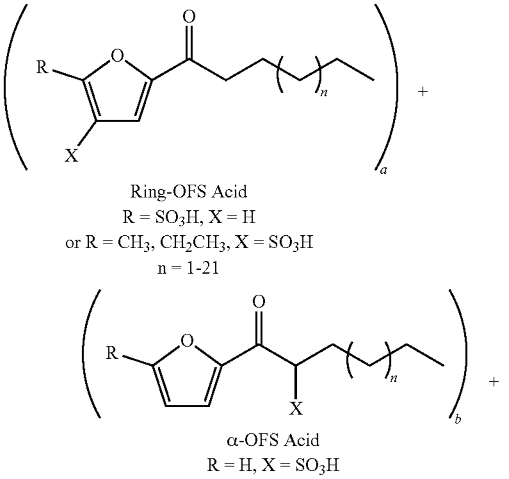

Ring-OFS Acid
R = $SO_3H$, X = H
or R = $CH_3$, $CH_2CH_3$, X = $SO_3H$
n = 1-21

α-OFS Acid
R = H, X = $SO_3H$
or R = $CH_3$, $CH_2CH_3$, X = $SO_3H$
n = 1-21

-continued

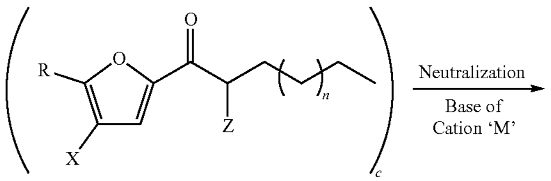

Ring, α-OFS Acid
$R = SO_3H$, $X = H$, $Z = SO_3H$
or $R = CH_3$, $CH_2CH_3$, $X = SO_3H$
$Z = SO_3H$
n = 1-21

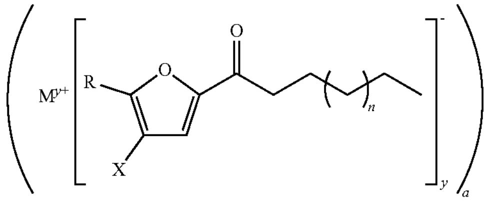

+

Ring-OFS M Salt
$M = Na^+, NH_4^+, Li^+, K^+, Ca^{2+}, Mg^{2+}$
$R = SO_3^-$, $X = H$
or $R = CH_3$, $CH_2CH_3$, $X = SO_3^-$
n = 1-21

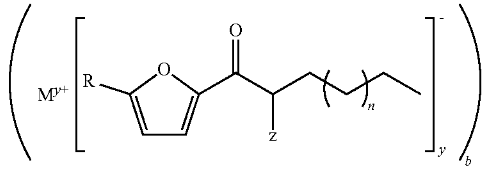

+

α-OFS M Salt
$M = Na^+, NH_4^+, Li^+, K^+, Ca^{2+}, Mg^{2+}$
$R = H$, $X = SO_3^-$
or $R = CH_3$, $CH_2CH_3$, $X = SO_3'$
n = 1-21

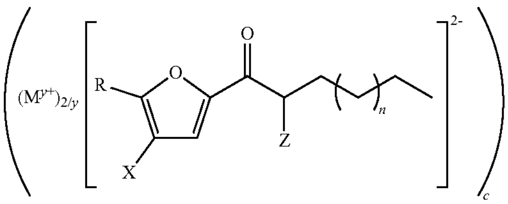

Ring, α-OFS M Salt
$M = Na^+, NH_4^+, Li^+, K^+, Ca^{2+}, Mg^{2+}$
$R = SO_3^-$, $X = H$, $Z = SO_3^-$
or $R = CH_3$, $CH_2CH_3$, $X = SO_3^-$
$Z = SO_3^-$
n = 1-21

Scheme 2 illustrates neutralization of oleo-furan sulfonic acids with mole ratios a, b, and c, where the product mole ratios of each surfactant can be identical to those for the corresponding sulfonic acid precursors, and the cation (M) is the cation(s) matching the base used during the neutralization process.

Methods disclosed herein can be carried out to produce various compound embodiments. One such exemplary embodiment includes a compound having the formula (General Structure 1 or "GS1"):

General Structure 1

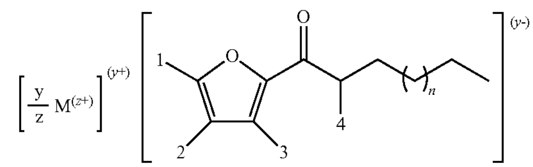

For General Structure 1, the position of the sulfonate moiety either on the oleo-furan ring (Ring-OFS), the alkyl chain adjacent to the ketone functional group (α-OFS) or in both positions (Ring, α-oleo-furan disulfonate) can be controlled by the reaction parameters including (1) sulfonating reagent, (2) sulfonating reagent loading, (3) solvent, (4) temperature, and (5) reaction time. Each numbered position in General Structure 1 designates a functional group, such as —H, —$CH_3$, a longer alkyl chain, —$SO_3^-$, or other functional group, with at minimum one of the functional groups 1-4 comprising a sulfonate ($SO_3^-$) functional group, and 'n' designating a variable number of carbon atoms (n=1-21) that are part of an extended saturated or unsaturated alkyl chain with a total of 6-26 carbons in length, where the alkyl chain includes the carbon atom connected to the furan ring with an acyl group. In some embodiments of General Structure 1, if either position 1 or 2 is a sulfonate (—$SO_3^-$), a second sulfonate functional group is present in position 4.

A more specific method embodiment of Scheme 1 disclosed herein includes Scheme 3, which can start with an oleo-methylfuran (OMF) compound and use a particular combination of the reaction parameters 1-5 to produce oleo-methylfuran sulfonic acids (OMFS Acid) with defined selectivity for a reproducible molar ratio of products a, b and c representing 4-OMFS Acid (a ring sulfonation in the $4^{th}$ ring position, or location 2 in General Structure 1), α-OMFS Acid, and 4, α-OMFS Acid. In a further embodiment, subsequent neutralization of these sulfonic acids according to the general method shown in Scheme 2 can be seen below as the exemplary Scheme 4, which can result in the OMFS surfactant salts with the cation matching the base used during neutralization, such as sodium, ammonium, lithium, potassium, calcium and magnesium, and molar ratios a, b and c for each product matching the sulfonic acid.

The exemplary embodiment of the sulfonation method shown in Scheme 5 uses an oleo-methylfuran feedstock with a $C_{12}$ alkoyl saturated carbon chain derived from lauric acid, dodecanoylmethylfuran, and provides a mechanism and rate constants for formation of each oleo-furan sulfonic acid produced during sulfonation of dodecanoylmethylfuran. In some embodiments, surfactants can be derived from oleo-furans prepared from a distribution of fatty acids with varying alkyl chain length and varying degrees of unsaturation, such as those obtained from soybean oil, to produce surfactant mixtures of varying alkyl chain length, the final product of which may or may not contain chain unsaturation.

As noted, another embodiment includes a method that utilizes a disubstituted furan to produce oleo-methylfuran sulfonic acids via the following exemplary reaction scheme, Scheme 3:

Scheme 3

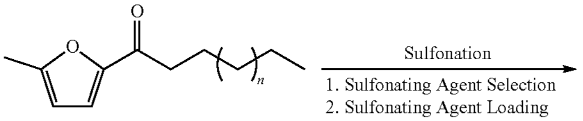

oleo-MethylFuran
n = 1-21

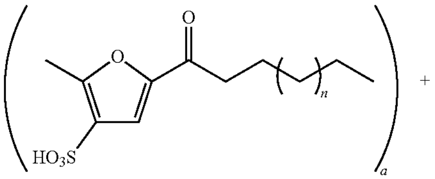

4-OMFS Acid

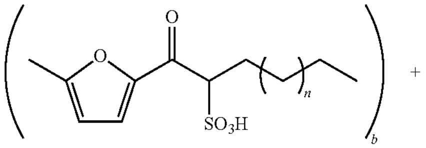

α-OMFS Acid

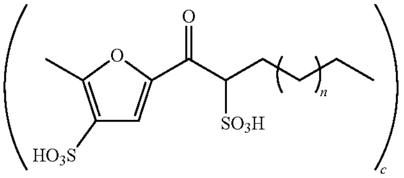

4,α-OMFS Acid

Scheme 3 illustrates oleo-furan sulfonation method using a disubstituted furan to produce oleo-methylfuran sulfonic acids with mole ratios a, b, and c, where tuning of reaction parameters 1-5 can used to achieve controlled selectivity for different mole ratios of the sulfonic acid products shown.

As also noted, an additional embodiment includes a method that includes an oleo-furan sulfonic acid neutralization process to produce oleo-methylfuran sulfonate surfactant salts via the following exemplary reaction scheme, Scheme 4:

Scheme 4

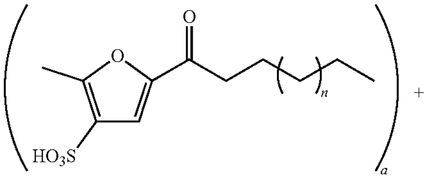

n = 1-21
4-OMFS Acid

-continued

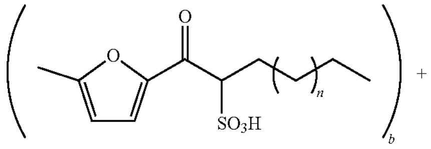

n = 1-21
α-OMFS Acid

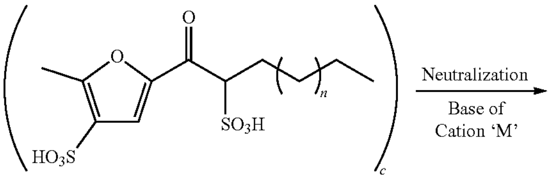

n = 1-21
4,α-OMFS Acid

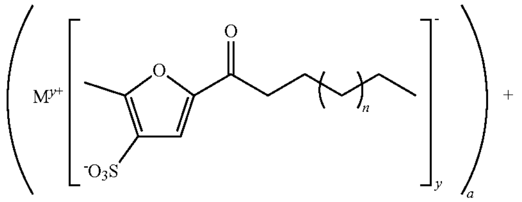

4-OMFS M Salt
M = $Na^+$, $NH_4^+$, $Li^+$, $K^+$, $Ca^{2+}$, $Mg^{2+}$

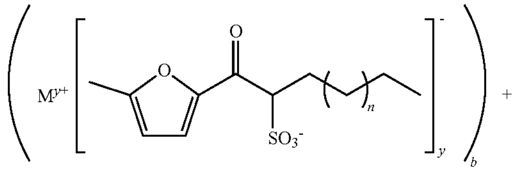

α-OMFS M Salt
M = $Na^+$, $NH_4^+$, $Li^+$, $K^+$, $Ca^{2+}$, $Mg^{2+}$

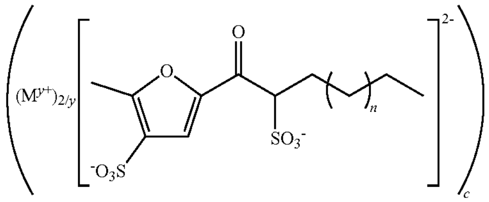

α-OMFS M Salt
M = $Na^+$, $NH_4^+$, $Li^+$, $K^+$, $Ca^{2+}$, $Mg^{2+}$

Scheme 4 illustrates an oleo-furan sulfonic acid neutralization process to produce oleo-methylfuran sulfonate surfactant salts with mole ratios a, b, and c, with adjustment of surfactant cation controlled by selection of base used in the neutralization process.

Finally, as also noted, another embodiment includes a method that includes sulfonation of dodecanoylmethylfuran with sulfuric acid sulfonating agent via the following exemplary reaction scheme, Scheme 5:

Scheme 5

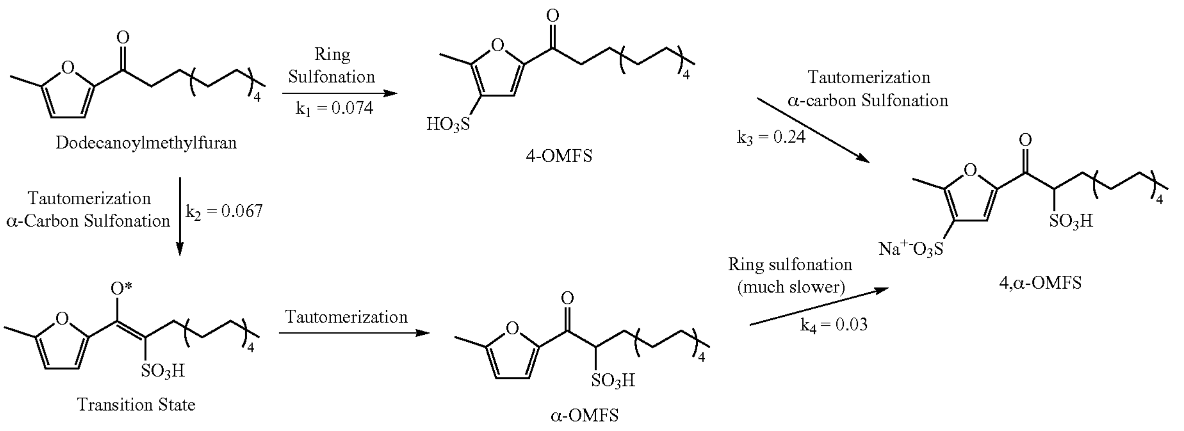

Scheme 5 illustrates reaction mapping and rate constants for the sulfonation of dodecanoylmethylfuran with sulfuric acid sulfonating agent (with mole ratios sulfuric acid: dodecanoylmethylfuran in the range from 1:1 to 3.8:1) using acetonitrile solvent in a temperature range between 40° C. and 50° C. The mechanism is shown for formation of ring (4-OMFS) and chain (α-OMFS) monosulfonic acids as well as a combined disulfonic acid product (4,α-OMFS) formed from a secondary sulfonation of either the ring or a monosulfonic acids.

Another embodiment includes a method. This method embodiment includes providing an oleo-furan compound according to the formula (1):

(I)

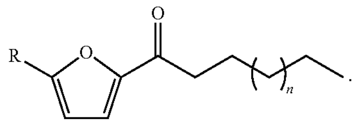

n = 1 - 21

R = H, $CH_3$, $CH_2CH_3$

Oleo-Furan

And, this method includes sulfonating this provided oleo-furan compound to produce at least two of a first oleo-furan sulfonic acid according to formula (2), a second oleo-furan sulfonic acid according to formula (3), and a third oleo-furan sulfonic acid according to formula (4):

(2)

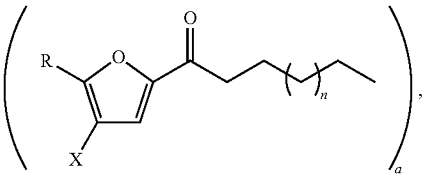

Ring-OFS Acid

R = $SO_3H$, X = H or

R = $CH_3$, $CH_2CH_3$, X = $SO_3H$

-continued (3)

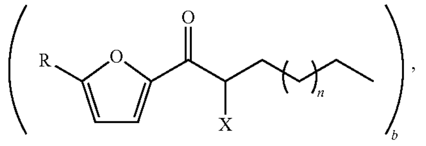

α-OFS Acid

R = H, X = $SO_3H$ or

R = $CH_3$, $CH_2CH_3$, X = $SO_3I$ (4)

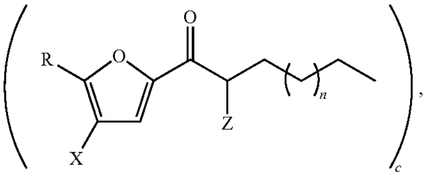

Ring, α-OFS Acid

R = $SO_3H$, X = H, Z = $SO_3H$ or

R = $CH_3$, $CH_2CH_3$, X = $SO_3H$

Z = $SO_3H$

In the above formulas, n is an extended saturated alkyl chain from 1 to 21 carbon atoms in length, and a, b, and c represent mole ratios of the at least two of the first oleo-furan sulfonic acid according to formula (2), the second oleo-furan sulfonic acid according to formula (3), and the third oleo-furan sulfonic acid according to formula (4).

In a further embodiment of this method, sulfonating the provided oleo-furan compound can include sulfonating the provided oleo-furan compound to produce each of the first oleo-furan sulfonic acid according to formula (2), the second oleo-furan sulfonic acid according to formula (3), and the third oleo-furan sulfonic acid according to formula (4).

In a further embodiment of this method, the method additionally includes selecting a sulfonating agent to control selectivity for mole ratios a, b, and c of the at least two of the first oleo-furan sulfonic acid according to formula (2), the second oleo-furan sulfonic acid according to formula (3), and the third oleo-furan sulfonic acid according to formula (4). As one such example, selecting the sulfonating agent can include selecting a first sulfonating agent to produce a first mole ratio a, b, and c of the at least two of the first oleo-furan sulfonic acid according to formula (2), the second oleo-furan sulfonic acid according to formula (3), and the third oleo-furan sulfonic acid according to formula (4). It can also include selecting a second sulfonating agent to produce a second mole ratio a, b, and c of the at least two of the first oleo-furan sulfonic acid according to formula (2), the second oleo-furan sulfonic acid according to formula (3), and the third oleo-furan sulfonic acid according to formula (4), and where the second sulfonating agent is different than the first sulfonating agent and the second mole ratio is different than the first mole ratio. As another such example, the method can further include selecting at least one of a sulfonating agent loading, a solvent type, a sulfonation temperature, and a sulfonation reaction time to further control selectivity for mole ratios a, b, and c of the at least two of the first oleo-furan sulfonic acid according to formula (2), the second oleo-furan sulfonic acid according to formula (3), and the third oleo-furan sulfonic acid according to formula (4). For instance, in this example, selecting at least one of the sulfonating agent loading, the solvent type, the sulfonation temperature, and the sulfonation reaction time can include selecting each of the sulfonating agent loading, the solvent type, the sulfonation temperature, and the sulfonation reaction time to further control selectivity for mole ratios a, b, and c of the at least two of the first oleo-furan sulfonic acid according to formula (2), the second oleo-furan sulfonic acid according to formula (3), and the third oleo-furan sulfonic acid according to formula (4). In another instance, selecting at least one of the sulfonating agent loading, the solvent type, the sulfonation temperature, and the sulfonation reaction time can include: selecting a first sulfonation temperature and a first sulfonation reaction time to produce a first mole ratio a, b, and c of the at least two of the first oleo-furan sulfonic acid according to formula (2), the second oleo-furan sulfonic acid according to formula (3), and the third oleo-furan sulfonic acid according to formula (4); and selecting a second sulfonation temperature and a second sulfonation reaction time to produce a second mole ratio a, b, and c of the at least two of the first oleo-furan sulfonic acid according to formula (2), the second oleo-furan sulfonic acid according to formula (3), and the third oleo-furan sulfonic acid according to formula (4), where the second sulfonation temperature is different than the first sulfonation temperature, the second sulfonation reaction time is different than the first sulfonation reaction time, and the second mole ratio is different than the first mole ratio.

In a further embodiment of this method, the method can additionally include neutralizing the produced at least two of the first oleo-furan sulfonic acid according to formula (2), the second oleo-furan sulfonic acid according to formula (3), and the third oleo-furan sulfonic acid according to formula (4) to produce at least two of a first neutralized oleo-furan sulfonic acid according to formula (5), a second neutralized oleo-furan sulfonic acid according to formula (6), and a third neutralized oleo-furan sulfonic acid according to formula (7):

(5)

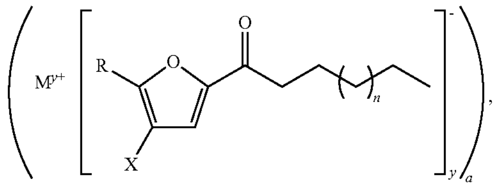

n = 1 - 21
Ring-OFS M Salt
M = $Na^+$, $NH_4^+$, $Li^+$, $K^+$, $Ca^{2+}$, $Mg^{2+}$
R = $SO_3^-$, X = H or
R = $CH_3$, $CH_2CH_3$, X = $SO_3^-$ (6)

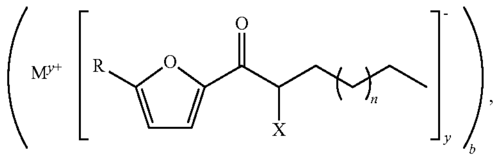

n = 1 - 21
α-OFS M Salt
M = $Na^+$, $NH_4^+$, $Li^+$, $K^+$, $Ca^{2+}$, $Mg^{2+}$
R = H, X = $SO_3^-$ or
R = $CH_3$, $CH_2CH_3$, X = $SO_3^-$ (7)

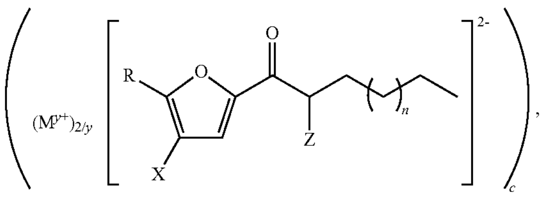

n = 1 - 21
Ring, α-OFS M Salt
M = $Na^+$, $NH_4^+$, $Li^+$, $K^+$, $Ca^{2+}$, $Mg^{2+}$
R = $SO_3^-$, X = H, Z = $SO_3$- or
R = $CH_3$, $CH_2CH_3$, X = $SO_3^-$
Z = $SO_3^-$ where a, b, and c represent mole ratios of the at least two of the first neutralized oleo-furan sulfonic acid according to formula (5), the second neutralized oleo-furan sulfonic acid according to formula (6), and the third neutralized oleo-furan sulfonic acid according to formula (7). As one such example, neutralizing the produced at least two of the first oleo-furan sulfonic acid according to formula (2), the second oleo-furan sulfonic acid according to formula (3), and the third oleo-furan sulfonic acid according to formula (4) can include neutralizing each of the first oleo-furan sulfonic acid according to formula (2), the second oleo-furan sulfonic acid according to formula (3), and the third oleo-furan sulfonic acid according to formula (4) to produce each of the first neutralized oleo-furan sulfonic acid according to formula (5), the second neutralized oleo-furan sulfonic acid according to formula (6), and the third neutralized oleo-furan sulfonic acid according to formula (7).

Another embodiment includes a method. This method embodiment includes providing an oleo-methylfuran compound according to the formula (1):

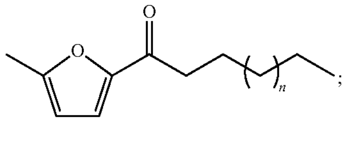
;

n = 1 - 21

Oleo-MethylFuran and And, this method embodiment includes sulfonating [1] the provided oleo-methylfuran compound to produce at least two of a first oleo-methylfuran sulfonic acid according to formula (2), a second oleo-methylfuran sulfonic acid according to formula (3), and a third oleo-methylfuran sulfonic acid according to formula (4):

(2)

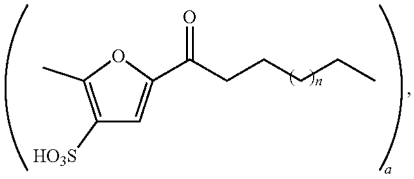
,

4-OMFS Acid (3)

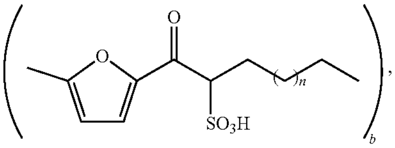
,

α-OMFS Acid (4)

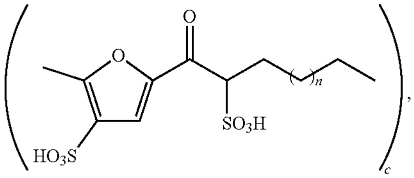
,

4,α-OMFS Acid

In the above formulas, n is an extended saturated alkyl chain from 1 to 21 carbon atoms in length, and a, b, and c represent mole ratios of the at least two of the first oleo-methylfuran sulfonic acid according to formula (2), the second oleo-methylfuran sulfonic acid according to formula (3), and the third oleo-methylfuran sulfonic acid according to formula (4).

In a further embodiment of this method, sulfonating the provided oleo-methylfuran compound can include sulfonating the provided oleo-methylfuran compound to produce each of the first oleo-methylfuran sulfonic acid according to formula (2), the second oleo-methylfuran sulfonic acid according to formula (3), and the third oleo-methylfuran sulfonic acid according to formula (4).

In a further embodiment of this method, the method can additionally include selecting a sulfonating agent to control selectivity for mole ratios a, b, and c of the at least two of the first oleo-methylfuran sulfonic acid according to formula (2), the second oleo-methylfuran sulfonic acid according to formula (3), and the third oleo-methylfuran sulfonic acid according to formula (4). As one such example, selecting the sulfonating agent can include selecting a first sulfonating agent to produce a first mole ratio a, b, and c of the at least two of the first oleo-methylfuran sulfonic acid according to formula (2), the second oleo-methylfuran sulfonic acid according to formula (3), and the third oleo-methylfuran sulfonic acid according to formula (4). In this such example, selecting the sulfonating agent can further include selecting a second sulfonating agent to produce a second mole ratio a, b, and c of the at least two of the first oleo-methylfuran sulfonic acid according to formula (2), the second oleo-methylfuran sulfonic acid according to formula (3), and the third oleo-methylfuran sulfonic acid according to formula (4), where the second sulfonating agent is different than the first sulfonating agent and the second mole ratio is different than the first mole ratio.

In a further embodiment of this method, the method can additionally include selecting at least one of a sulfonating agent loading, a solvent type, a sulfonation temperature, and a sulfonation reaction time to further control selectivity for mole ratios a, b, and c of the at least two of the first oleo-methylfuran sulfonic acid according to formula (2), the second oleo-methylfuran sulfonic acid according to formula (3), and the third oleo-methylfuran sulfonic acid according to formula (4). As one such example, selecting at least one of the sulfonating agent loading, the solvent type, the sulfonation temperature, and the sulfonation reaction time can include selecting each of the sulfonating agent loading, the solvent type, the sulfonation temperature, and the sulfonation reaction time to further control selectivity for mole ratios a, b, and c of the at least two of the first oleo-methylfuran sulfonic acid according to formula (2), the second oleo-methylfuran sulfonic acid according to formula (3), and the third oleo-methylfuran sulfonic acid according to formula (4). For instance, selecting at least one of the sulfonating agent loading, the solvent type, the sulfonation temperature, and the sulfonation reaction time can include: selecting a first sulfonation temperature and a first sulfonation reaction time to produce a first mole ratio a, b, and c of the at least two of the first oleo-methylfuran sulfonic acid according to formula (2), the second oleo-methylfuran sulfonic acid according to formula (3), and the third oleo-methylfuran sulfonic acid according to formula (4), and selecting a second sulfonation temperature and a second sulfonation reaction time to produce a second mole ratio a, b, and c of the at least two of the first oleo-methylfuran sulfonic acid according to formula (2), the second oleo-methylfuran sulfonic acid according to formula (3), and the third oleo-methylfuran sulfonic acid according to formula (4), where the second sulfonation temperature is different than the first sulfonation temperature, the second sulfonation reaction time is different than the first sulfonation reaction time, and the second mole ratio is different than the first mole ratio.

In a further embodiment of this method, the method can additionally include neutralizing the produced at least two of the first oleo-methylfuran sulfonic acid according to formula (2), the second oleo-methylfuran sulfonic acid according to formula (3), and the third oleo-methylfuran sulfonic acid according to formula (4) to produce at least two of a first neutralized oleo-methylfuran sulfonic acid according to formula (5), a second neutralized oleo-methylfuran sulfonic acid according to formula (6), and a third neutralized oleo-methylfuran sulfonic acid according to formula (7):

(5)

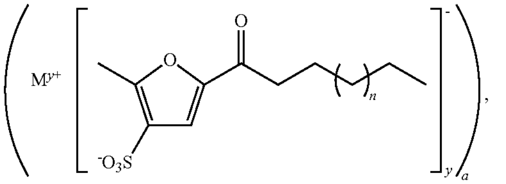

4-OMFS M Salt
M = $Na^+$, $NH_4^+$, $Li^+$, $K^+$, $Ca^{2+}$, $Mg^2$ (6)

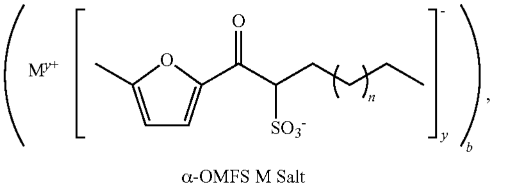

α-OMFS M Salt
M = $Na^+$, $NH_4^+$, $Li^+$, $K^+$, $Ca^{2+}$, $Mg^{2+}$ (7)

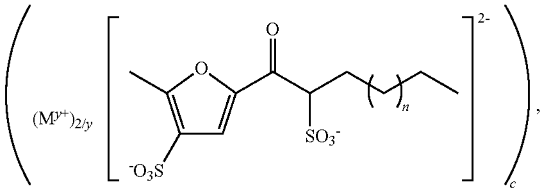

α-OMFS M Salt
M = $Na^+$, $NH_4^+$, $Li^+$, $K^+$, $Ca^{2+}$, $Mg^{2+}$

In the above formulas, a, b, and c represent mole ratios of the at least two of the first neutralized oleo-methylfuran sulfonic acid according to formula (5), the second neutralized oleo-methylfuran sulfonic acid according to formula (6), and the third neutralized oleo-methylfuran sulfonic acid according to formula (7). As one example, neutralizing the produced at least two of the first oleo-methylfuran sulfonic acid according to formula (2), the second oleo-methylfuran sulfonic acid according to formula (3), and the third oleo-methylfuran sulfonic acid according to formula (4) can include neutralizing each of the first oleo-methylfuran sulfonic acid according to formula (2), the second oleo-methylfuran sulfonic acid according to formula (3), and the third oleo-methylfuran sulfonic acid according to formula (4) to produce each of the first neutralized oleo-methylfuran sulfonic acid according to formula (5), the second neutralized oleo-methylfuran sulfonic acid according to formula (6), and the third neutralized oleo-methylfuran sulfonic acid according to formula (7).

DETAILED DESCRIPTION

Figure 1:
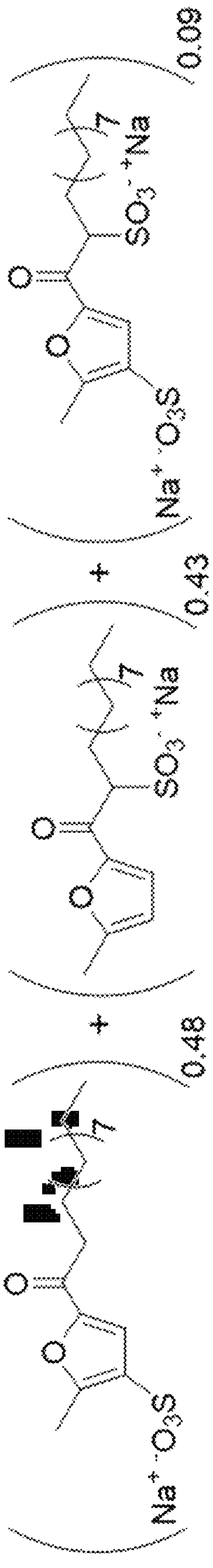
FIG. 1 illustrates oleo-furan surfactants formed from neutralization of sulfonic acids produced from methods disclosed herein using a sodium hydroxide solution to achieve a final pH of 7.5.

The following detailed description is exemplary in nature and is not intended to limit the scope, applicability, or configuration of the invention in any way. Rather, the following description provides some practical illustrations for implementing exemplary embodiments of the present invention. Examples of elements, materials, compositions, and/or steps are provided below. Though those skilled in the art will recognize that many of the noted examples have a variety of suitable alternatives that are also within the scope of the present disclosure.

Embodiments disclosed herein relate to surfactant compositions and related methods for synthesizing such surfactants. In particular, disclosed herein are embodiments including oleo-furan surfactant compositions and related methods for tuning sulfonation of oleo-furans and controlling oleo-furan surfactant compositions.

More specifically, this disclosure embodiments of methods for sulfonation of oleo-furan compounds derived from a furan moiety and either an individual fatty acid or a mixture of fatty acids representative of those yielded from plant oils (e.g., coconut oil). Additionally, this disclosure describes embodiments where tuning the sulfonation conditions produces new, unique oleo-furan sulfonate blends which can demonstrate beneficial surfactant characteristics and improvements in various applications.

One exemplary embodiment includes a method of sulfonating an oleo-furan (OF) molecule or substituted oleo-furan molecule (e.g., oleo-methylfuran, OMF) via the following reaction scheme, Scheme 1:

Scheme 1

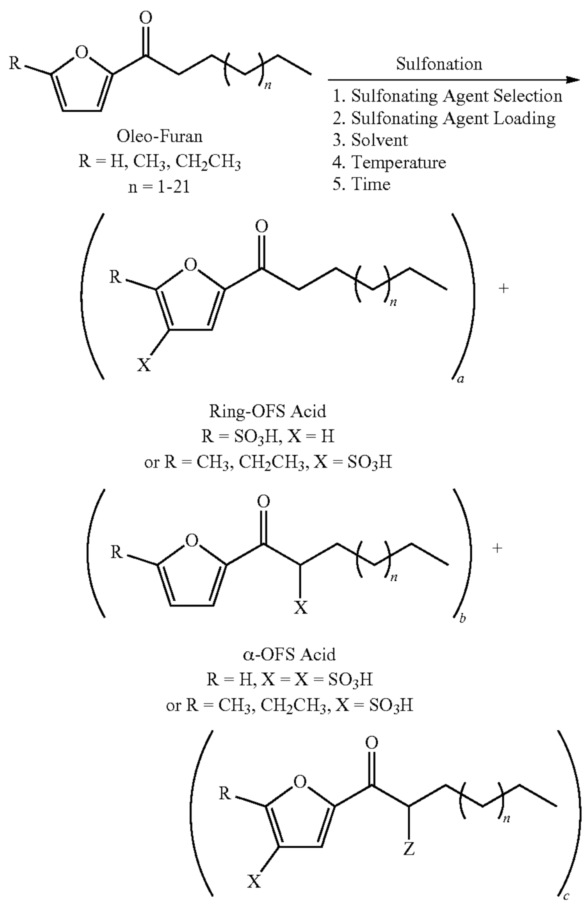

Oleo-Furan
R = H, $CH_3$, $CH_2CH_3$
n = 1-21

Ring-OFS Acid
R = $SO_3H$, X = H
or R = $CH_3$, $CH_2CH_3$, X = $SO_3H$

α-OFS Acid
R = H, X = X = $SO_3H$
or R = $CH_3$, $CH_2CH_3$, X = $SO_3H$

Ring, α-OFS Acid
R = $SO_3H$, X = H, Z = $SO_3H$
or R = $CH_3$, $CH_2CH_3$, X = $SO_3H$
Z = $SO_3H$ Scheme 1 illustrates sulfonation of oleo-furans to produce at least two of the three illustrated oleo-furan sulfonic acids with mole ratios a, b, and c, where tuning of noted reaction parameters 1-5 can used to achieve controlled selectivity for different mole ratios of the compounds shown. Namely, various combinations of (1) sulfonating agent, (2) sulfonating agent loading, indicated by the molar ratio of sulfonating agent to oleo-furan added to the reaction mixture, (3) solvent used or absence thereof (neat), (4) temperature and (5) reaction time can provide selective formation of one or more oleo-furan sulfonic acids. Optional neutralization of the formed sulfonic acids with a base as illustrated in Scheme 2, below, can yield surfactant salts of General Structure 1 (GS1), illustrated below. Schemes 1 and 2 illustrate the general sulfonation and neutralization processes that may utilize a number of oleo-furan feedstocks, including those with ring-substituted functional groups such as —H, —$CH_3$, —$CH_2CH_3$, a longer alkyl chain, —OH, —$SO_3$—, —$SO_3H$, or other functional groups, and 'n' designates a variable number of carbon atoms (n=1-21) that are part of an extended saturated or unsaturated alkyl chain with a total of 6-26 carbons in length, where the alkyl chain includes the carbon atom connected to the furan ring with an acyl group.

As noted, another exemplary embodiment includes a method that includes neutralization of oleo-furan sulfonic acids via the following exemplary reaction scheme, Scheme 2:

Scheme 2

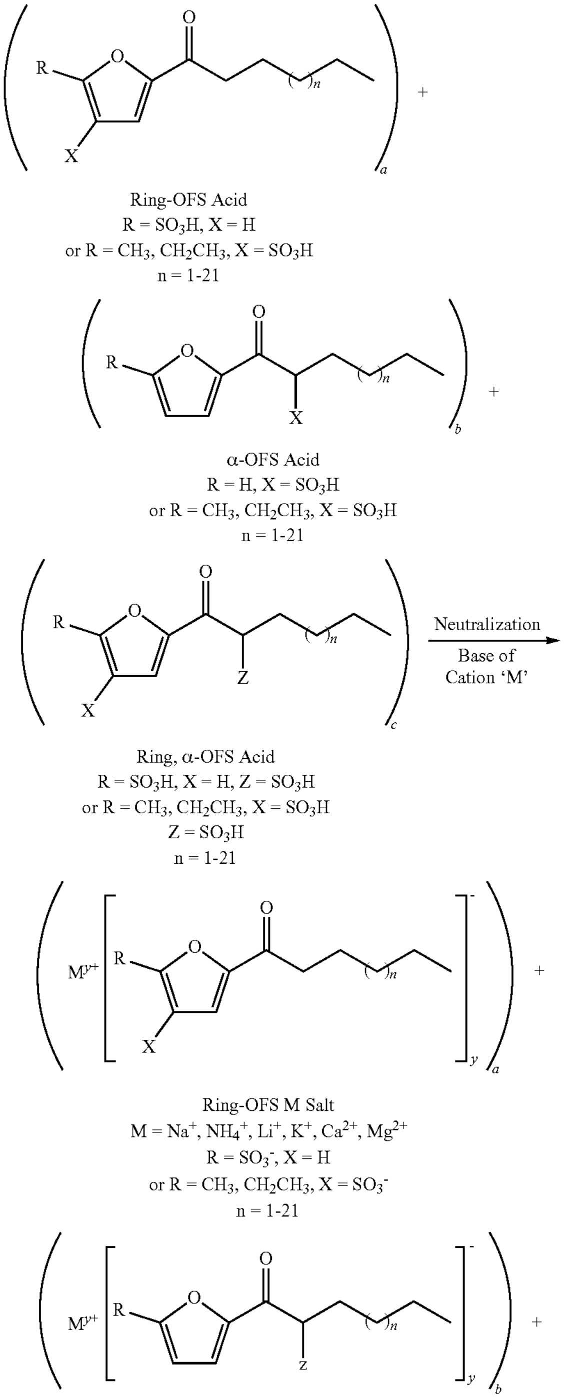

Ring-OFS Acid
R = $SO_3H$, X = H
or R = $CH_3$, $CH_2CH_3$, X = $SO_3H$
n = 1-21

α-OFS Acid
R = H, X = $SO_3H$
or R = $CH_3$, $CH_2CH_3$, X = $SO_3H$
n = 1-21

Ring, α-OFS Acid
R = $SO_3H$, X = H, Z = $SO_3H$
or R = $CH_3$, $CH_2CH_3$, X = $SO_3H$
Z = $SO_3H$
n = 1-21

Ring-OFS M Salt
M = $Na^+$, $NH_4^+$, $Li^+$, $K^+$, $Ca^{2+}$, $Mg^{2+}$
R = $SO_3^-$, X = H
or R = $CH_3$, $CH_2CH_3$, X = $SO_3^-$
n = 1-21

α-OFS M Salt
M = $Na^+$, $NH_4^+$, $Li^+$, $K^+$, $Ca^{2+}$, $Mg^{2+}$
R = H, X = $SO_3^-$
or R = $CH_3$, $CH_2CH_3$, X = $SO_3^-$
n = 1-21

-continued

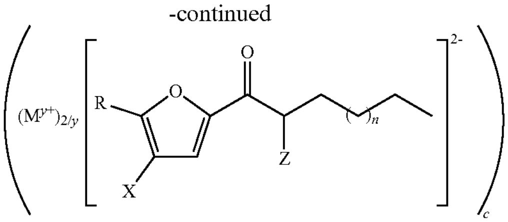

Ring, α-OFS M Salt
M = $Na^+$, $NH_4^+$, $Li^+$, $K^+$, $Ca^{2+}$, $Mg^{2+}$
R = $SO_3^-$, X = H, Z = $SO_3^-$
or R = $CH_3$, $CH_2CH_3$, X = $SO_3^-$
Z = $SO_3^-$
n = 1-21

Scheme 2 illustrates neutralization of oleo-furan sulfonic acids with mole ratios a, b, and c, where the product mole ratios of each surfactant can be identical to those for the corresponding sulfonic acid precursors, and the cation (M) is the cation(s) matching the base used during the neutralization process.

Methods disclosed herein can be carried out to produce various compound embodiments. One such exemplary embodiment includes a compound having the formula General Structure 1 ("GS1") as follows:

General Structure 1

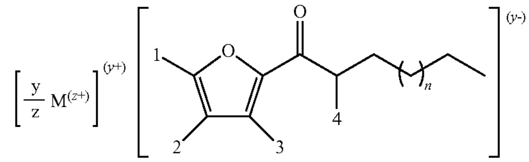

For General Structure 1, the position of the sulfonate moiety either on the oleo-furan ring (Ring-OFS), the alkyl chain adjacent to the ketone functional group (α-OFS) or in both positions (Ring, α-oleo-furan disulfonate) can be controlled by the reaction parameters including (1) sulfonating reagent, (2) sulfonating reagent loading, (3) solvent, (4) temperature, and (5) reaction time. Each numbered position in General Structure 1 designates a functional group, such as —H, —$CH_3$, a longer alkyl chain, —$SO_3$—, or other functional group, with at minimum one of the functional groups 1-4 comprising a sulfonate (SO3-) functional group, and 'n' designating a variable number of carbon atoms (n=1-21) that are part of an extended saturated or unsaturated alkyl chain with a total of 6-26 carbons in length, where the alkyl chain includes the carbon atom connected to the furan ring with an acyl group. In some embodiments of General Structure 1, if either position 1 or 2 is a sulfonate (—$SO_3$—), a second sulfonate functional group is present in position 4.

A more specific method embodiment of Scheme 1 disclosed herein includes Scheme 3, which can start with an oleo-methylfuran (OMF) compound and use a particular combination of the reaction parameters 1-5 to produce oleo-methylfuran sulfonic acids (OMFS Acid) with defined selectivity for a reproducible molar ratio of products a, b and c representing 4-OMFS Acid (a ring sulfonation in the 4[1] ring position, or location 2 in General Structure 1), α-OMFS Acid, and 4, α-OMFS Acid. In a further embodiment, subsequent neutralization of these sulfonic acids according to the general method shown in Scheme 2 can be seen below as the exemplary Scheme 4, which can result in the OMFS surfactant salts with the cation matching the base used during neutralization, such as sodium, ammonium, lithium, potassium, calcium and magnesium, and molar ratios a, b and c for each product matching the sulfonic acid.

The exemplary embodiment of the sulfonation method shown in Scheme 5 uses an oleo-methylfuran feedstock with a $C_{12}$ alkoyl saturated carbon chain derived from lauric acid, dodecanoylmethylfuran, and provides a mechanism and rate constants for formation of each oleo-furan sulfonic acid produced during sulfonation of dodecanoylmethylfuran. In some embodiments, surfactants can be derived from oleo-furans prepared from a distribution of fatty acids with varying alkyl chain length and varying degrees of unsaturation, such as those obtained from soybean oil, to produce surfactant mixtures of varying alkyl chain length, the final product of which may or may not contain chain unsaturation.

As noted, another embodiment includes a method that utilizes a disubstituted furan to produce oleo-methylfuran sulfonic acids via the following exemplary reaction scheme, Scheme 3:

Scheme 3

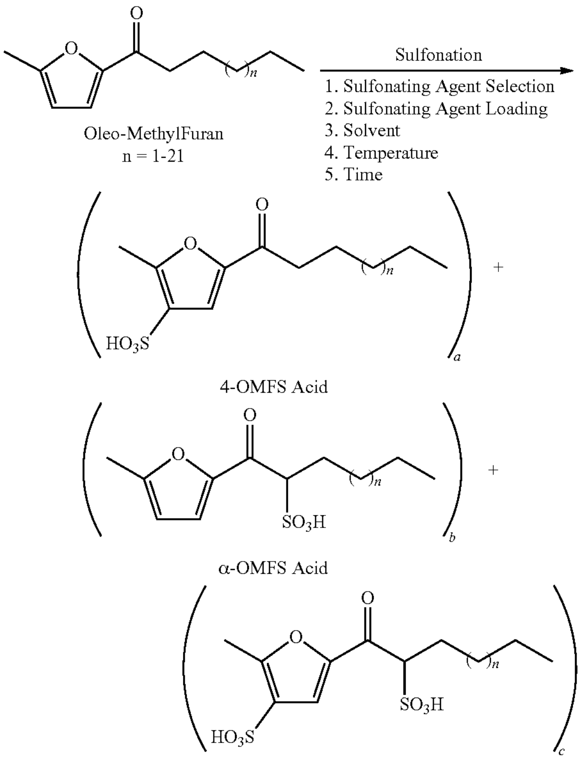

Oleo-MethylFuran
n = 1-21

4-OMFS Acid

α-OMFS Acid

4,α-OMFS Acid

Scheme 3 illustrates oleo-furan sulfonation method using a disubstituted furan to produce at least two of the three illustrated oleo-methylfuran sulfonic acids with mole ratios a, b, and c, where tuning of reaction parameters 1-5 can used to achieve controlled selectivity for different mole ratios of the sulfonic acid products shown.

As also noted, an additional embodiment includes a method that includes an oleo-furan sulfonic acid neutralization process to produce oleo-methylfuran sulfonate surfactant salts via the following exemplary reaction scheme, Scheme 4:

Scheme 4

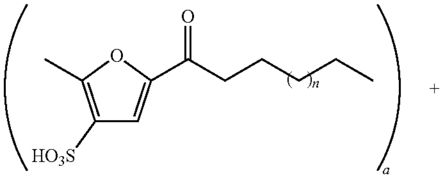

4-OMFS Acid
n = 1-21

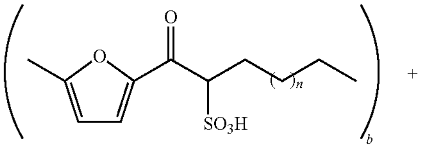

α-OMFS Acid
n = 1-21

-continued

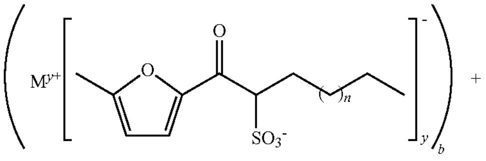

α-OMFS M Salt
M = $Na^+$, $NH_4^+$, $Li^+$, $K^+$, $Ca^{2+}$, $Mg^{2+}$

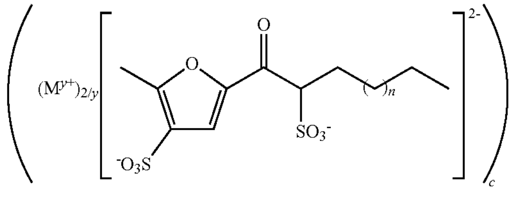

α-OMFS M Salt
M = $Na^+$, $NH_4^+$, $Li^+$, $K^+$, $Ca^{2+}$, $Mg^{2+}$

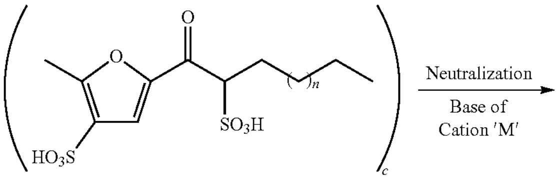

4,α-OMFS Acid
n = 1-21

Scheme 4 illustrates an oleo-furan sulfonic acid neutralization process to produce oleo-methylfuran sulfonate surfactant salts with mole ratios a, b, and c, with adjustment of surfactant cation controlled by selection of base used in the neutralization process.

Finally, as also noted, another embodiments includes a method that includes sulfonation of dodecanoylmethylfuran with sulfuric acid sulfonating agent via the following exemplary reaction scheme, Scheme 5:

Scheme 5

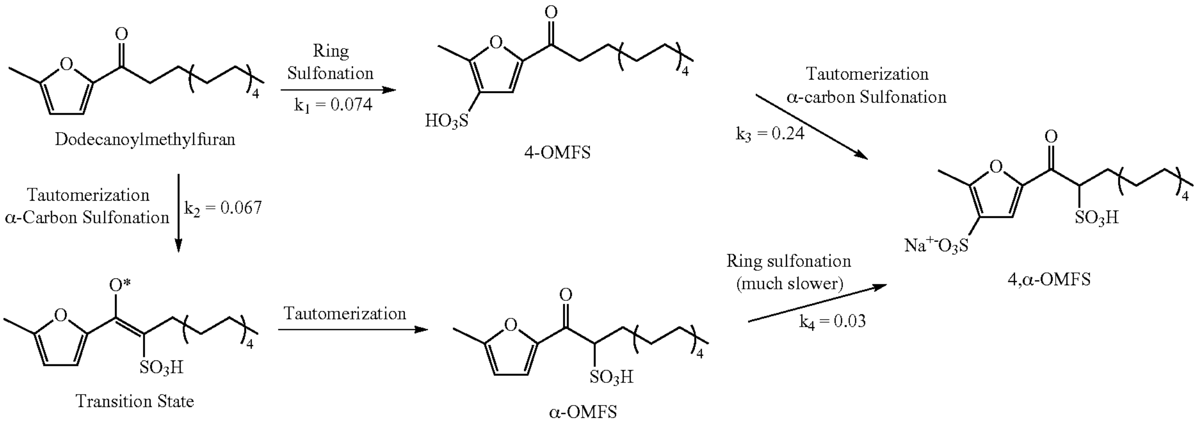

Dodecanoylmethylfuran

4-OMFS

4,α-OMFS

Transition State

α-OMFS

-continued

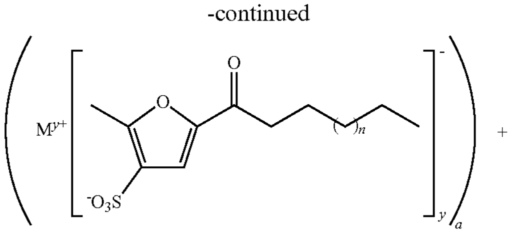

4-OMFS M Salt
M = $Na^+$, $NH_4^+$, $Li^+$, $K^+$, $Ca^{2+}$, $Mg^{2+}$

Scheme 5 illustrates reaction mapping and rate constants for the sulfonation of dodecanoylmethylfuran with sulfuric acid sulfonating agent (with mole ratios sulfuric acid: dodecanoylmethylfuran in the range from 1:1 to 3.8:1) using acetonitrile solvent in a temperature range between 40° C. and 50° C. The mechanism is shown for formation of ring (4-OMFS) and chain (α-OMFS) monosulfonic acids as well as a combined disulfonic acid product (4,α-OMFS) formed from a secondary sulfonation of either the ring or a monosulfonic acids.

Exemplary details relating to the disclosed reaction steps in the various schemes are discussed as follows.

As to sulfonation, sulfonation of oleo-furan compounds was conducted by dissolving or suspending the oleo-furan compound in an organic solvent, or in the absence of solvent (neat), then introducing a sulfonating agent such as oleum or organic sulfur trioxide complexes at the desired temperature in a range from −20° C. to 80° C. and allowing the contents to combine for a set amount of time in the range of 1 minute (i.e., immediate quenching after addition of sulfonating agent) to 72 hours. In some instances, a secondary sulfonating agent was added to the reaction mixture to further modify the sulfonation reactivity. In some instances, the oleo-furan sulfonating agent mixture were adjusted to a second temperature in the range of −20° C. to 80° C. for a set period of time to adjust the reactivity and further tune the selectivity of oleo-furan sulfonic acid species produced. The reaction was typically concluded by adding from 10 wt % to 300 wt % water to quench the remaining sulfonating agent, followed by a neutralization step with a base to form oleo-furan surfactants salts. More details on the solvents, methods and reagents used during the sulfonation, quenching, neutralization, or combined quenching-neutralization steps are disclosed in the examples provided herein.

As to acid form neutralization, optional neutralization of the protic monoanionic or diprotic dianionic surfactant can be achieved by slow addition of a base containing the cation of choice, including but not limited to sodium carbonate, calcium carbonate, sodium hydroxide, or calcium hydroxide, to solution that is either entirely aqueous or that is composed of both water and organic in a mixture, with a ratio is 0-90 v/v % organic solvent by volume, and the organic solvent includes, but is not limited to, nitriles such as acetonitrile, alkanes such as hexanes, or chlorocarbons such as chloroform. This process can result in the surfactant salt with the selected cation in solution, which can then reduced to a solid by heating in a temperature range from 25-80° C. while optionally applying vacuum in the pressure range of 1 mTorr-760 Torr. Removal of residual sulfate or carbonate salts in the product mixture, which may be present in varying quantities depending on the sulfonation method and neutralization base salt selected, can be achieved by dissolving the solids in a minimum of water and adding sufficient organic solvent, including but not limited to acetone, to prepare a 1:1 aqueous to organic solvent solution by volume. This solution can be mixed thoroughly, then can stored at a temperature between 0 and 15° C. for a period of time from 1-48 hours. The solid salt can then removed by filtration, and the surfactant can be recovered from the filtrate by heating in a temperature range from 25-80° C. while optionally applying a vacuum in the pressure range of 1 mTorr-760 Torr to dry the surfactant product. If unsulfonated organics or sulfated byproducts remain in the product mixture, removal can be achieved by recrystallization in organic solvent including but not limited to water, isopropanol, ethanol, methanol, acetonitrile, acetone, or mixtures composed of, but not limited to, the aforementioned solvents.

The methods disclosed herein can be carried out using any of a variety of feedstocks. As examples, feedstocks used in the process can include one or more of, but are not limited to, oleo-furans and substituted oleo-furans including but not limited to decanoylfuran, dodecanoylfuran, tetradecanoylfuran, hexadecanoylfuran, octadecanoylfuran, decanoylmethylfuran, dodecanoylmethylfuran, tetradecanoylmethylfuran, hexadecanoylmethylfuran, octadecanoylmethylfuran, with carbon chain lengths varying from ($C_6$ to $C_{26}$) that can be saturated or unsaturated (mono-, di-, or tri-), and solvents.

Solvents used for sulfonation of oleo-furans and the optional neutralization of the oleo-furan sulfonic acids as well as the optional surfactant purification can include, for example, one or more of ketones including acetone and methylethylketone, hydrocarbons including but not limited to pentane, hexane, and heptane, cyclohexane, and cyclopentane, aromatic organics including benzene, toluene, organic nitriles including acetonitrile, propionitrile, and butyronitrile, organic chlorocarbons including dichloromethane, dichloroethane, chloroform, alcohols including but not limited to methanol, ethanol, and isopropanol, ethereal solvents including but not limited to dimethyl ether, diethyl ether, and tetrahydrofuran, esters including but not limited to methyl acetate and ethyl acetate, water and finally the absence of solvent (neat).

Method embodiments disclosed herein can be carried out to produce various compound embodiments within the scope of the present disclosure. One such exemplary embodiment includes a compound having the formula General Structure 1 or "GS1," shown previously.

Other compound embodiments within the scope of the present disclosure can be based on the formula of General Structure 1. General Structure 1 and the other disclosed compound embodiments based thereon can provide unique characteristics and performance in comparison to prior oleo-furan surfactants. General Structure 1 and the other disclosed compound embodiments based thereon constitute a new class of oleo-furan surfactant, with a sulfonate moiety positioned either on the alkyl chain adjacent to the ketone functional group (position 4), or on both the furan ring (positions 1-3) and alkyl chain adjacent to the ketone functional group (position 4), representing a dianionic, disulfonate surfactant species. These mono- and dianionic sulfonate surfactants can be charge balanced with a number of cations including, for example, but not limited to, $Na^+$, $Ca^{2+}$, $Mg^{2+}$, $Li^+$, $K^+$, and $NH_4^+$.

For the compound embodiments based on General Structure 1 and disclosed herein, as well as General Structure 1 itself, the alkyl chain length either on the terminal end of the furan moiety including the carbon atom connected to the furan ring containing an acyl functional group can vary from n=1 to n=21 ($C_6$ to $C_{26}$, respectively) preferably being in the alkyl chain range of n=1 to n=13 ($C_6$ to $C_{18}$, respectively), more preferably being in the alkyl chain range of n=3 to n=13 ($C_8$ to $C_{18}$, respectively), and most preferably being in the alkyl chain range of n=5 to n=13 ($C_{10}$ to $C_{18}$, respectively). In various embodiments, the length of the alkyl chain can be a critical surfactant structural feature and varied alkyl chain length can alter surfactant characteristics, including factors that impact performance in various applications, e.g., laundry detergency. For these reasons, alkyl chain lengths in one range, e.g., $C_1$-$C_5$, are generally considered to produce surfactants with significantly different application performance than those in another range, e.g., $C_6$-$C_{26}$.

In the depicted composition structure of the embodiment of General Structure 1 above, functional groups designated by numbers 1-4 can include —H, —$CH_3$, —$CH_2CH_3$, a longer alkyl chain, —OH, polyglycoside, polyethoxylate, sulfate and sulfonate. More preferably, these functional group could include —H, —$CH_3$, sulfonate, sulfate, polyglycoside, and polyethoxylate. Most preferably, these functional groups could include —H, —$CH_3$, sulfate and sulfonate.

One embodiment of a surfactant composition structure based on General Structure 1 is depicted as follows as Structure A of General Structure 1:

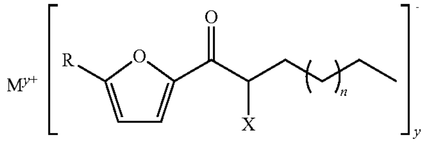

n = 1 - 21

M = $Na^+$, $NH_4^+$, $Li^+$, $K^+$, $Ca^{2+}$, $Mg^{2+}$

R= H, X = $SO_3H$ or

R = $CH_3$, $CH_2CH_3$, X = $SO_3H$

Structure A of General Structure 1

A further embodiment of Structure A can include a surfactant structure depicted as follows as Structure A1 of General Structure 1:

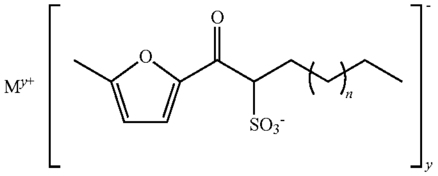

n = 1 - 21

M = $Na^+$, $NH_4^+$, $Li^+$, $K^+$, $Ca^{2+}$, $Mg^{2+}$

Structure A1 of General Structure 1

A yet further embodiment of Structure A, and also of Structure A1, can include a surfactant structure depicted as follows as Structure A2 of General Structure 1:

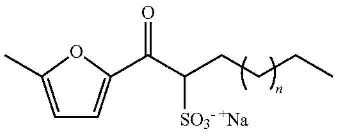

n = 1 - 21

Structure A2 of General Structure 1

A particular embodiment of Structure A2, and thus also of Structure A, can include a surfactant structure depicted as follows as Structure A2-4 of General Structure 1:

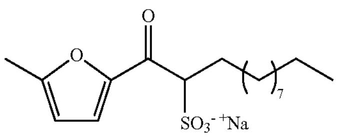

Structure A2-1 of General Structure A

Another embodiment of a surfactant composition structure based on General Structure 1 is depicted follows as Structure B of General Structure 1:

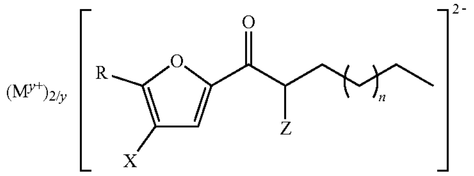

n = 1 - 21

M = $Na^+$, $NH_4^+$, $Li^+$, $K^+$, $Ca^{2+}$, $Mg^{2+}$

R = $SO_3^-$, X = H, Z = $SO_3^-$ or R = $CH_3$, $CH_2CH_3$, X = $SO_3^-$, Z = $SO_3^-$

Structure B of General Structure 1

A further embodiment of Structure B can include a surfactant structure depicted as follows as Structure B1 of General Structure 1:

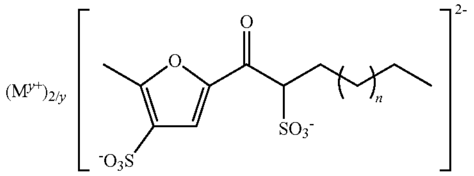

n = 1-21

M = $Na^+$, $NH_4^+$, $Li^+$, $K^+$, $Ca^{2+}$, $Mg^{2+}$

Structure B1 of General Structure 1

A particular embodiment of Structure B1, and thus also of Structure B, can include a surfactant structure depicted as follows as Structure B1-1 of General Structure 1:

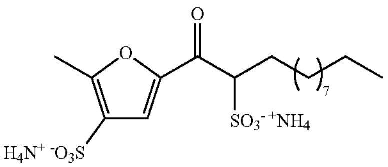

Structure B1-1 of General Structure 1

A further embodiment of Structure B, and also of Structure B1, can include a surfactant structure depicted as follows as Structure B2 of General Structure 1:

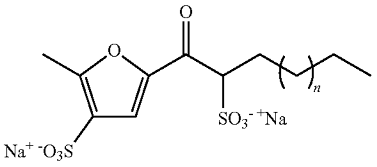

n = 1-21

Structure B2 of General Structure 1

A particular embodiment of Structure B2, and thus also of Structure B, can include a surfactant structure depicted as follows as Structure B2-1 of General Structure 1:

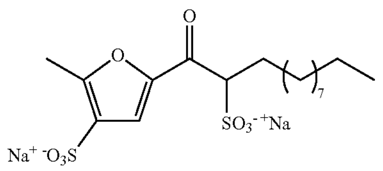

Structure B2-1 of General Structure 1

Another particular embodiment of Structure B2, and thus also of Structure B, can include a surfactant structure depicted as follows as Structure B2-2 of General Structure 1:

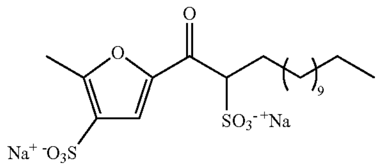

Structure B2-2 of General Structure 1

Yet another particular embodiment of Structure B2, and thus also of Structure B, can include a surfactant structure depicted as follows as Structure B2-3 of General Structure 1:

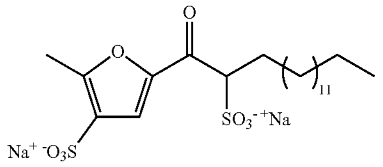

Structure B2-3 of General Structure 1

Yet another particular embodiment of Structure B2, and thus also of Structure B, can include a surfactant structure depicted as follows as Structure B2-4 of General Structure 1:

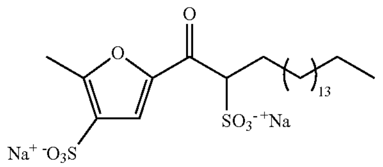

Structure B2-4 of General Structure 1

A further embodiment of Structure B can include a surfactant structure depicted as follows as Structure B3 of General Structure 1:

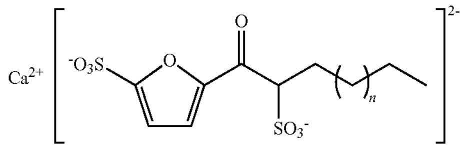

Structure B3 of General Structure 1

Another embodiment of Structure B3, and thus also of Structure B, can include a surfactant structure depicted as follows as Structure B3-1 of General Structure 1:

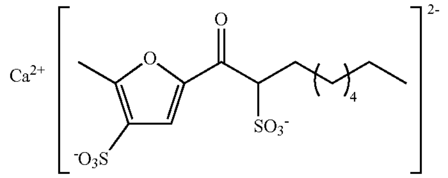

Structure B3-1 of General Structure 1

The following describes an example of a general reaction method for oleo-furan sulfonation.

An oleo-furan compound can be dissolved in a solvent including, but not limited to, alkanes such as hexane and heptane, nitriles such as acetonitrile or propionitrile, or chlorocarbons such as dichloromethane and chloroform, at a concentration ranging between 0.001 M to 1 M, or is used in the absence of solvent (neat). The oleo-furan compound or solution is then cooled or heated to a temperature in the range of −20° C. to 80° C., more preferably in the range of 0° C. to 60° C., and most preferably in the range of 0° C. to 40° C., after which a sulfonating agent can be added, including but not limited to sulfur trioxide organic complexes such as $SO_3$•pyridine, $SO_3$•dimethylaniline, $SO_3$•dimethylformamide, $SO_3$•triethylamine, $SO_3$•trimethylamine, and $SO_3$•quinoline, chlorosulfonic acid, sulfuric acid, sodium sulfate, sodium bisulfate, sulfamic acid, or oleum (e.g., fuming sulfuric acid with an $SO_3$ active concentration range from 5 wt % to 65 wt %) at a molar ratio loading of sulfonating agent to oleo-furan from 0.5 to 6.4, more preferably at a sulfonating agent to oleo-furan ratio of 0.5 to 3.2, and most preferably at a sulfonating agent to oleo-furan ratio of 0.5 to 2. A second sulfonating agent is optionally added to augment the reactivity of the first sulfonating agent, including but not limited to all sulfonating agents listed above, at a molar ratio loading of sulfonating agent to oleo-furan from 0.01 to 1, more preferably at a sulfonating agent to oleo-furan ratio of 0.01 to 0.5, and most preferably at a sulfonating agent to oleo-furan ratio of 0.01 to 0.1. The reaction is then stirred for a period of time, which is tailored to the desired level of sulfonation reactivity ranging from 1 minute (e.g., the reaction is quenched immediately after sulfonating agent addition) to 72 hours, more preferably 1 minute to 24 hours, and most preferably 1 minute to 1 hour. After this time, the reaction can be quenched with a mass of water in the range of 10 wt % of the reaction solution's mass to 300 wt %, more preferably 50 wt % to 150 wt %, and most preferably 75 wt % to 150 wt %. After quenching but prior to neutralization, an optional liquid-liquid extraction step can be performed by adding a solvent including but not limited to alkanes such as hexanes or heptane to remove unsulfonated oleo-furan materials from the aqueous sulfonated products. The quenched sulfonic acid solutions can then optionally be treated with a basic aqueous solution including, but not limited to, sodium hydroxide, calcium hydroxide, magnesium hydroxide, potassium hydroxide, or lithium hydroxide in the concentration range of 1-50 w/v % with mass of base solution added in the range of 10 wt % to 300 wt % h of the sulfonation reaction's mass, targeting a final surfactant solution pH in the range of 4-10. As an alternative to quenching the reaction with deionized water and separately neutralizing the sulfonic acids with a base solution after, the reaction can optionally be quenched and neutralized simultaneously by adding a basic aqueous solution including, but not limited to, sodium hydroxide, calcium hydroxide, magnesium hydroxide, potassium hydroxide, or lithium hydroxide in the concentration range of 1-50 w/v % with mass of solution added in the range of 10 wt % to 300 wt % of the sulfonation reaction's mass, targeting a final surfactant solution pH in the range of 4-10.

Described below are exemplary, non-limiting methods that follow the general experimental methods listed above and fit the general sulfonation reaction scheme illustrated above as Scheme 1. Methods and analysis provided in the following method descriptions include the subsequent neutralization step (illustrated in Scheme 2 above); however, these methods do not require neutralization to achieve the designated selectivity for the produced sulfonic acids, and in some embodiments the neutralization step may be omitted for production of the oleo-furan sulfonic acid blends.

Example 1

Example 1 describes embodiments of an oleo-methylfuran sulfonate (OMFS) surfactant blends having one or more synergistic properties and exemplary methods of synthesizing such surfactant blend embodiments.

A 0.37 M solution of dodecanoylmethylfuran in acetonitrile was prepared and heated to 40° C., after which time $SO_3$•pyridine was added in a mole ratio of 2:1 sulfonating agent to dodecanoylmethylfuran. Sulfuric acid is then added in a mole ratio of 0.05:1 sulfonating agent to dodecanoylmethylfuran, and the reaction is allowed to stir for 72 hours, after which time the reaction was quenched by adding a mass of deionized water equal to 100% of the reaction mass. The percent molar distribution of 4-OMFS, α-OMFS, and 4,α-OMFS products as determined by $^1$H NMR was 48:43:9. The $SO_3$ actives determined by Hyamine active titration (performed according to ASTM D4251) was 87%, and the total surfactant yield was 29%. The reaction scheme representing this method, including oleo-furan reagent(s) used and product distribution, can be seen in Scheme 6. The sodium-OMFS surfactant blend yielded by neutralization of the sulfonation acids produced by this method with sodium hydroxide solution to a pH of 7.5 can be seen in FIG. 1, and the $^1$H NMR spectrum of the sodium surfactant blend can be referenced in FIG. 2. The calcium-OMFS surfactant blend yielded by neutralization of the sulfonation acids produced by this method with calcium hydroxide solution to a pH of 7 can be seen in FIG. 3. The magnesium-OMFS surfactant blend yielded by neutralization of the sulfonation acids produced by this method with magnesium hydroxide solution to a pH of 7.5 can be seen in FIG. 4. The properties of the sodium, calcium and magnesium surfactant blends are reported in Table 1.

Scheme 6

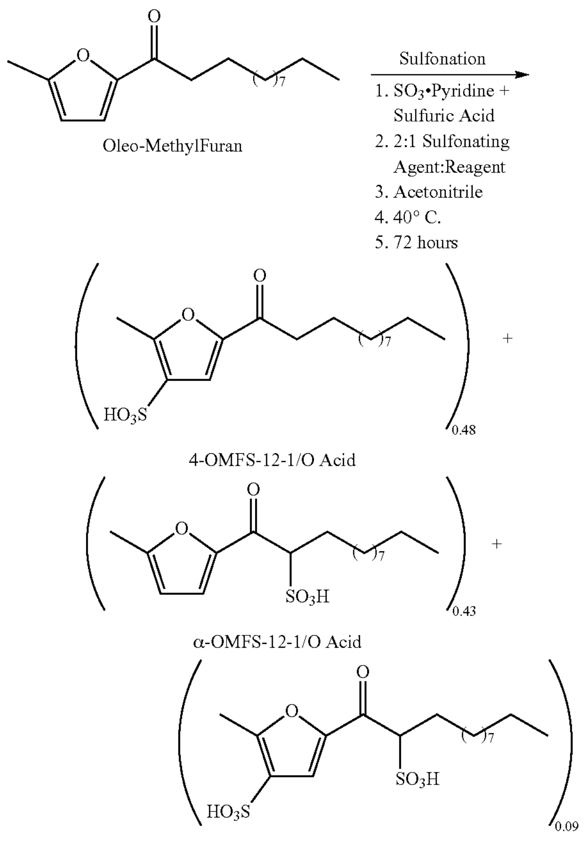

Oleo-MethylFuran

4-OMFS-12-1/O Acid

α-OMFS-12-1/O Acid

4,α-OMFS-12-1/O Acid

Scheme 6 illustrates reaction conditions and oleo-furan sulfonic acid product distribution for Example 1.

FIG. 1 illustrates oleo-furan surfactants formed from neutralization of sulfonic acids produced from methods detailed above for Example 11 using a sodium hydroxide solution to achieve a final pH of 7.5.

Figure 2:
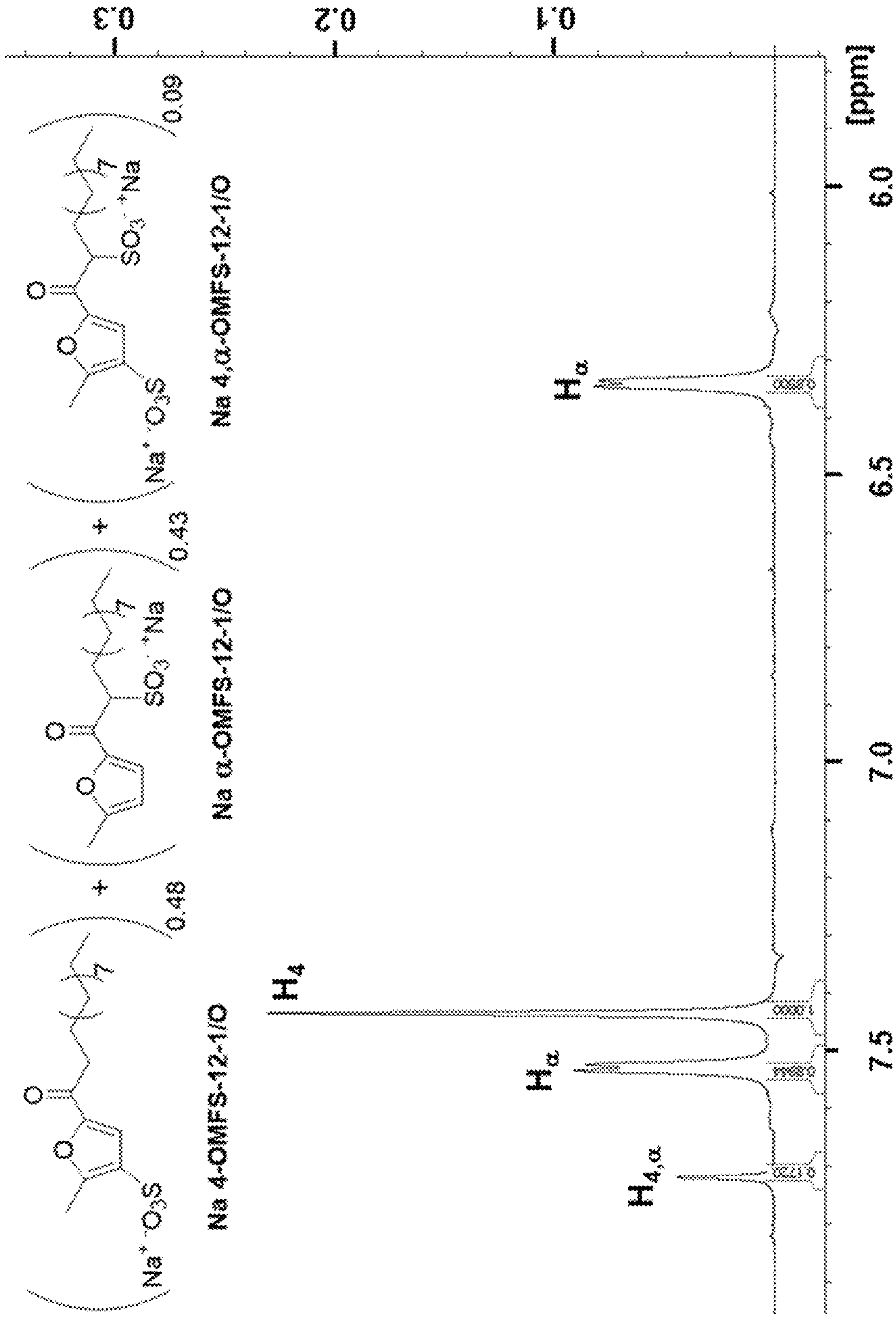
FIG. 2 illustrates a $^1$H NMR spectra of sodium OMFS-blend plotting the aromatic proton signal region and the specific proton signals corresponding to individual sulfonate species in the blend.

FIG. 2 illustrates $^1$H NMR spectra of sodium OMFS-Blend showing the aromatic proton signal region and the specific proton signals corresponding to individual sulfonate species in the blend.

Figure 3:
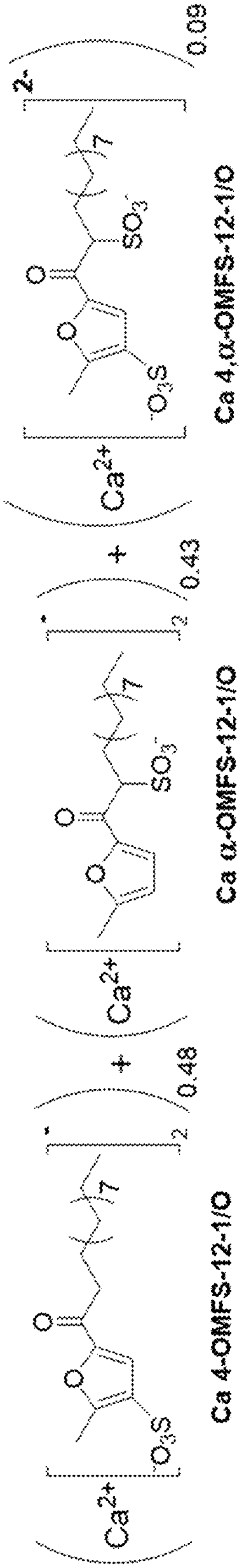
FIG. 3 illustrates oleo-furan surfactants formed from neutralization of sulfonic acids produced from methods disclosed herein using a calcium hydroxide solution to achieve a final pH of 7.

FIG. 3 illustrates oleo-furan surfactants formed from neutralization of sulfonic acids produced from methods detailed above for Example 1 using a calcium hydroxide solution to achieve a final pH of 7.

Figure 4:
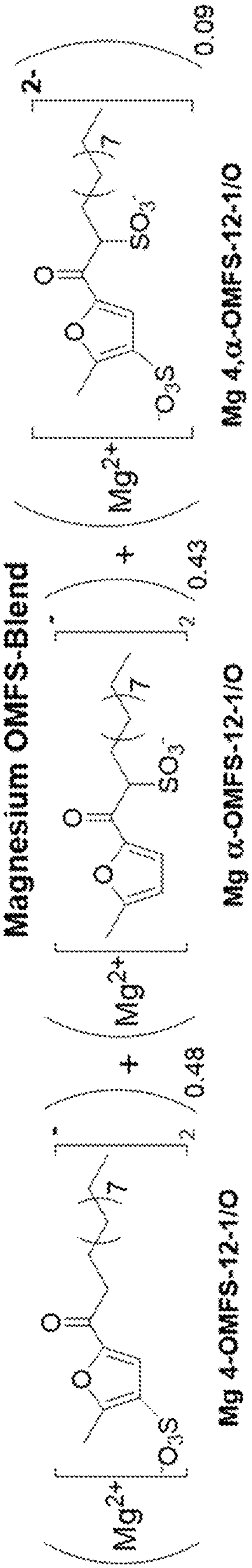
FIG. 4 illustrates oleo-furan surfactants formed from neutralization of sulfonic acids produced from methods disclosed herein using a magnesium hydroxide solution to achieve a final pH of 7.5.

FIG. 4 illustrates oleo-furan surfactants formed from neutralization of sulfonic acids produced from methods detailed above for Example 1 using a magnesium hydroxide solution to achieve a final pH of 7.5.

Example 2

Example 2 describes method embodiments for primary selectivity to α-OMFS surfactant ($C_{12}$ alkyl chain) embodiments.

A 0.15 M solution of dodecanoylmethylfuran in acetonitrile was prepared and heated to 60° C., after which time SO3•dimethylformamide was added in a mole ratio of 1:1 sulfonating agent to dodecanoylfuran. The reaction was allowed to stir for 24 hours, after which time the reaction was quenched by adding a mass of deionized water equal to 100% of the reaction mass. The percent molar distribution of 4-OMFS, α-OMFS, and 4,α-OMFS products as determined by 1H NMR was 8:78:14. The total reaction yield was 41%. The reaction scheme representing this method, including oleo-furan reagent(s) used and product distribution, can be seen in Scheme 7.

Scheme 7

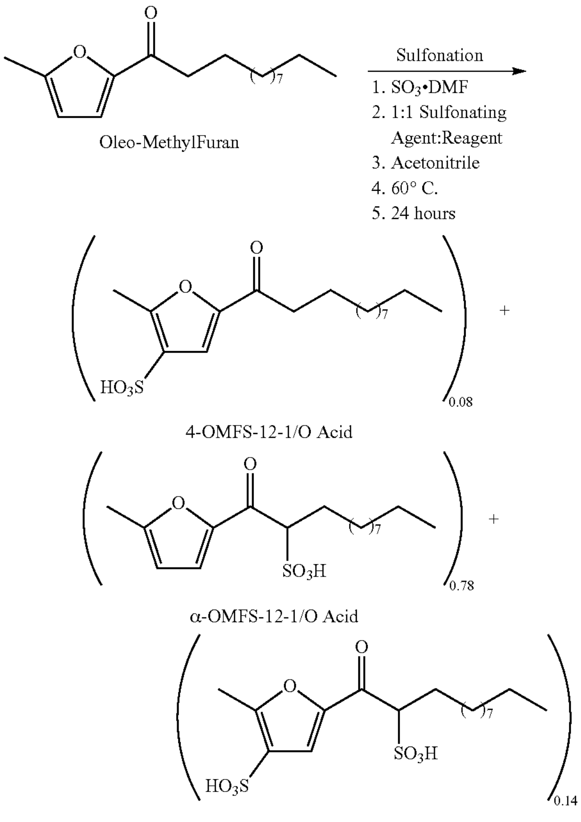

Oleo-MethylFuran

4-OMFS-12-1/O Acid

α-OMFS-12-1/O Acid

4,α-OMFS-12-1/O Acid

Scheme 7 illustrates reaction conditions and oleo-furan sulfonic acid product distribution for Example 2.

Figure 5:
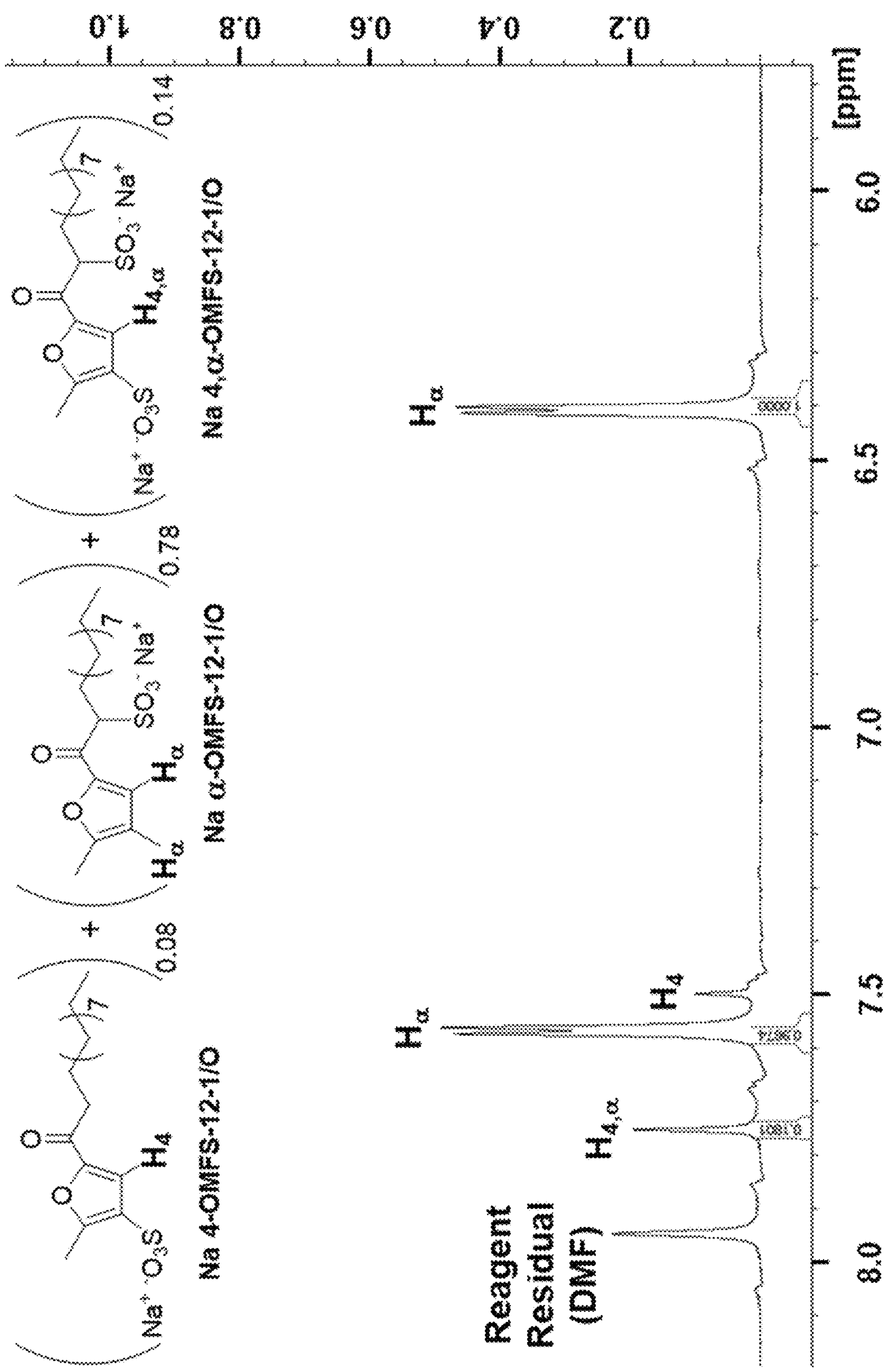
FIG. 5 illustrates a $^1$H NMR spectra of sodium surfactant blend after neutralization with sodium hydroxide and plotting the aromatic proton signal region and the specific proton signals corresponding to individual sulfonate species in the blend.

FIG. 5 illustrates $^1$H NMR spectra of sodium surfactant blend produced by the technique described above for Example 2 after neutralization with sodium hydroxide, showing the aromatic proton signal region and the specific proton signals corresponding to individual sulfonate species in the blend.

Example 3

Example 3 describes method embodiments for primary selectivity to 4,α-OMFS surfactant ($C_{12}$ alkyl chain) embodiments.

A 0.76 M solution of dodecanoylmethylfuran in acetonitrile was prepared and heated to 60° C., after which time $SO_3$•dimethylformamide was added in a mole ratio of 2:1 sulfonating agent to dodecanoylfuran. The reaction was allowed to stir for 72 hours, after which time the reaction was quenched by adding a mass of deionized water equal to 100% of the reaction mass. The percent molar distribution of 4-OMFS, α-OMFS, and 4,α-OMFS products as determined by $^1$H NMR was 3:7:90. The total reaction yield was 70%. The reaction scheme representing this method, including oleo-furan reagent(s) and reaction conditions used as well as product distribution, can be seen in Scheme 8. The sodium-OMFS surfactant blend yielded by neutralization of the sulfonation acids produced by this method with sodium hydroxide solution to a pH of 7.8 as well as the H NMR spectrum of the sodium surfactant blend can be referenced in FIG. 6.

Scheme 8

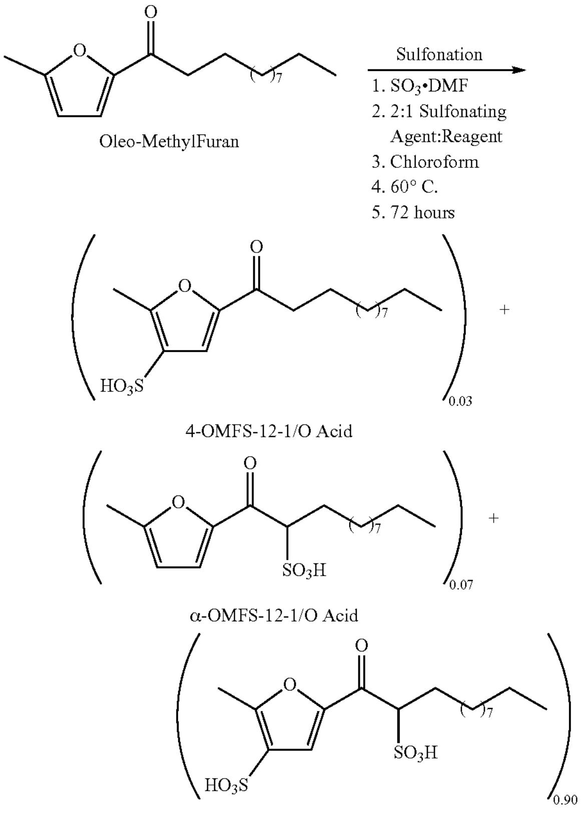

Oleo-MethylFuran

4-OMFS-12-1/O Acid

α-OMFS-12-1/O Acid

4,α-OMFS-12-1/O Acid

Scheme 8 illustrates reaction conditions and oleo-furan sulfonic acid product distribution for an embodiment per Example 3.

Figure 6:
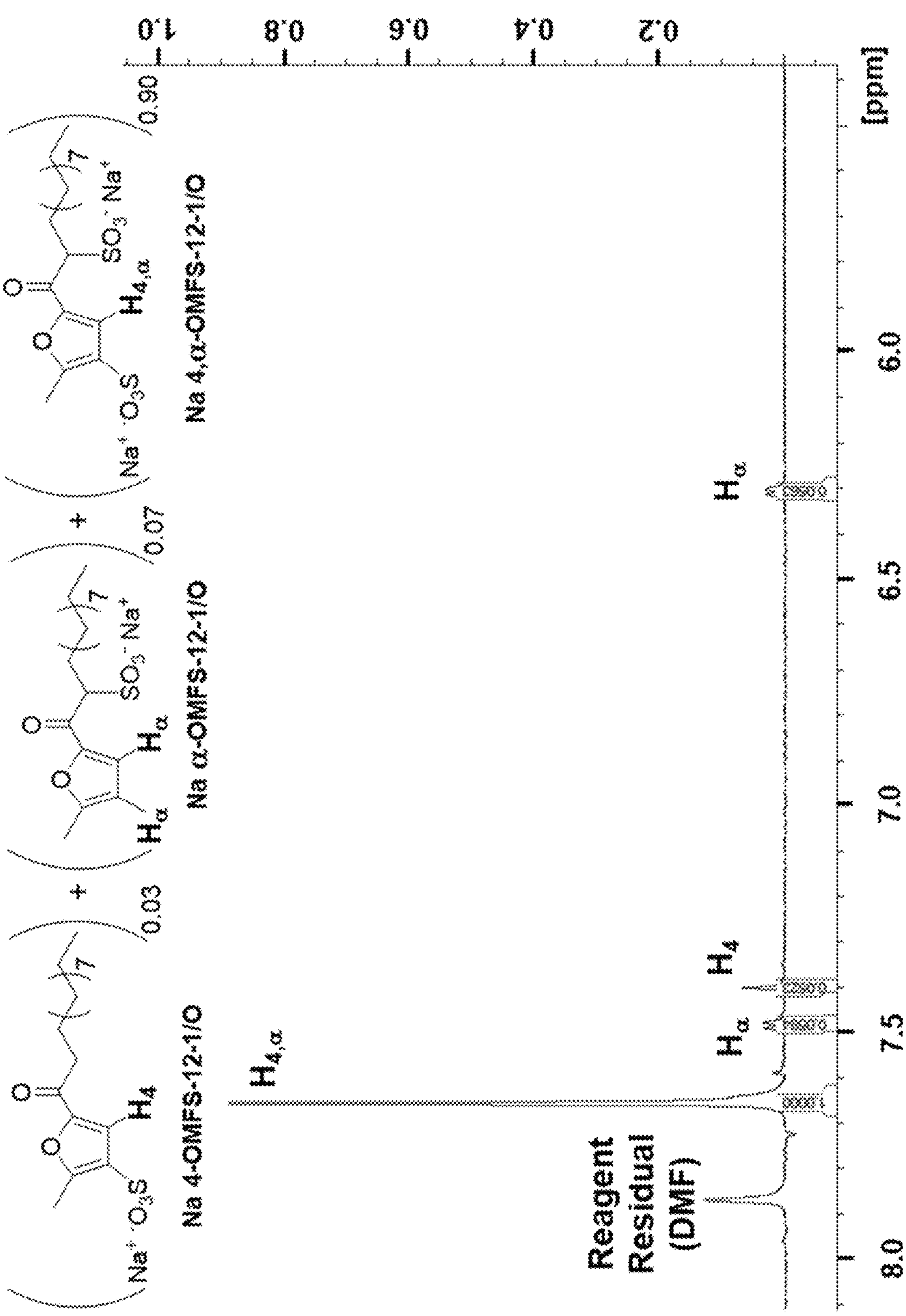
FIG. 6 illustrates a $^1$H NMR spectra of sodium surfactant blend after neutralization with sodium hydroxide to a pH of 7.8 and plotting the aromatic proton signal region and the specific proton signals corresponding to individual sulfonate species in the blend.

FIG. 6 illustrates $^1$H NMR spectra of sodium surfactant blend produced per the technique described here for Example 3 after neutralization with sodium hydroxide to a pH of 7.8, showing the aromatic proton signal region and the specific proton signals corresponding to individual sulfonate species in the blend.

Example 4

Example 4 describes method embodiments for primary selectivity to 4-OMFS surfactant ($C_{12}$ alkyl chain) embodiments.

Oleum (10 mL, 20 wt % $SO_3$) in the absence of solvent (neat) was cooled to 0° C. and 2 g dodecanoylfuran was added with stirring to provide a $SO_3$ to dodecanoylmethylfuran molar ratio of 6.4:1. Immediately after oleum addition, the reaction was quenched by adding a mass of deionized water equal to 100% of the reaction mass. The percent molar distribution of 4-OMFS, α-OMFS, and 4,α-OMFS products as determined by $^1$H NMR was 98:0:2. The total reaction yield was 29%. The reaction scheme representing this method embodiment, including oleo-furan reagent(s) and reaction conditions used as well as product distribution, can be seen in Scheme 9 below.

Scheme 9

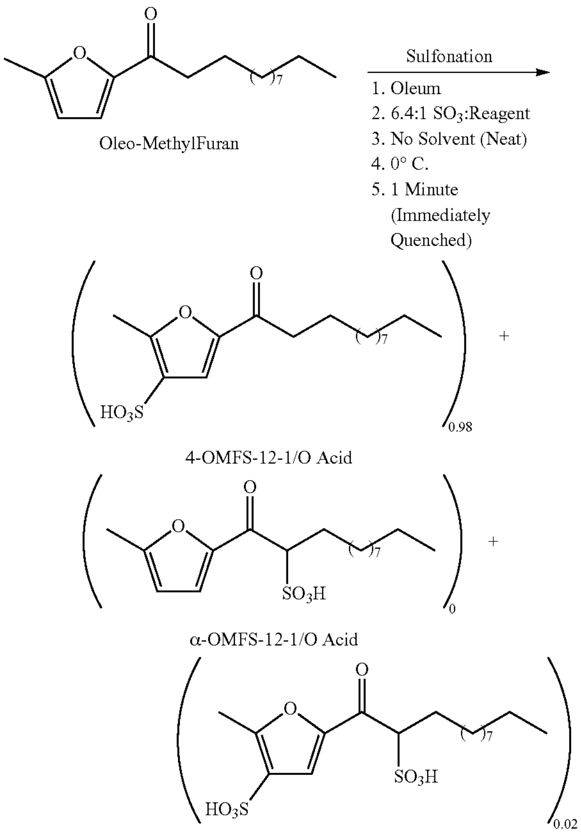

Oleo-MethylFuran

4-OMFS-12-1/O Acid

α-OMFS-12-1/O Acid

4,α-OMFS-12-1/O Acid

Scheme 9 illustrates reaction conditions and oleo-furan sulfonic acid product distribution for an embodiment per Example 4.

Example 5

Example 5 describes alternate method embodiments, relative to Example 4, for primary selectivity to 4-OMFS surfactant ($C_{12}$ alkyl chain) embodiments.

g of dodecanoylmethylfuran was heated to 60° C. in a jacketed flask in the absence of solvent (neat), to which oleum (10 mL, 15 wt % h $SO_3$) was added dropwise with stirring to provide a $SO_3$ to dodecanoylmethylfuran molar ratio of 3.2:1. Immediately after oleum addition, the reaction was quenched by adding a mass of deionized water equal to 100% of the reaction mass. The percent molar distribution of 4-OMFS, α-OMFS, and 4,α-OMFS products as determined by $^1$H NMR was 100:0:0. The total reaction yield was 13%. The reaction scheme representing this method, including oleo-furan reagent(s) and reaction conditions used as well as product distribution, can be seen in Scheme 10. The sodium-OMFS surfactant blend yielded by neutralization of the sulfonation acids produced by this method with sodium hydroxide solution to a H of 8 can be seen in FIG. 7, Scheme 10

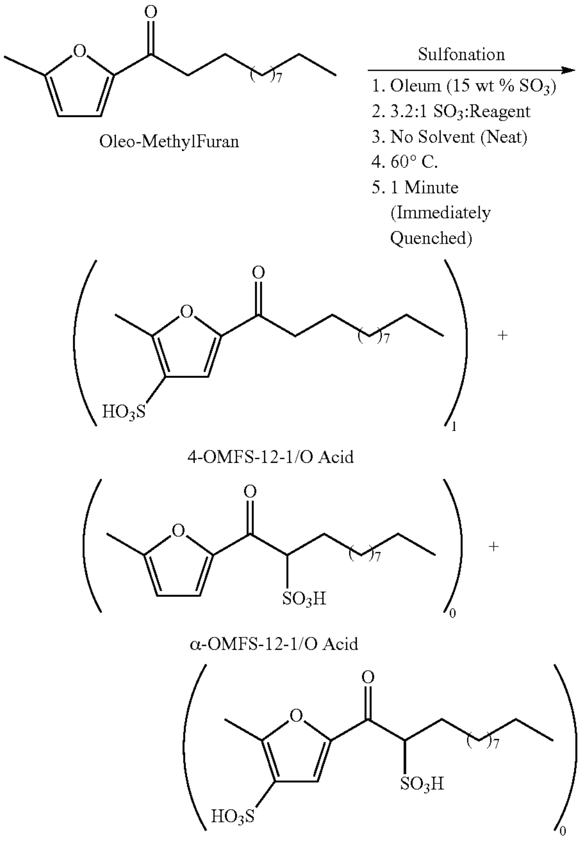

Oleo-MethylFuran

4-OMFS-12-1/O Acid

α-OMFS-12-1/O Acid

4,α-OMFS-12-1/O Acid

Scheme 10 illustrates reaction conditions and oleo-furan sulfonic acid product distribution for an embodiment per Example 5.

Figure 7:
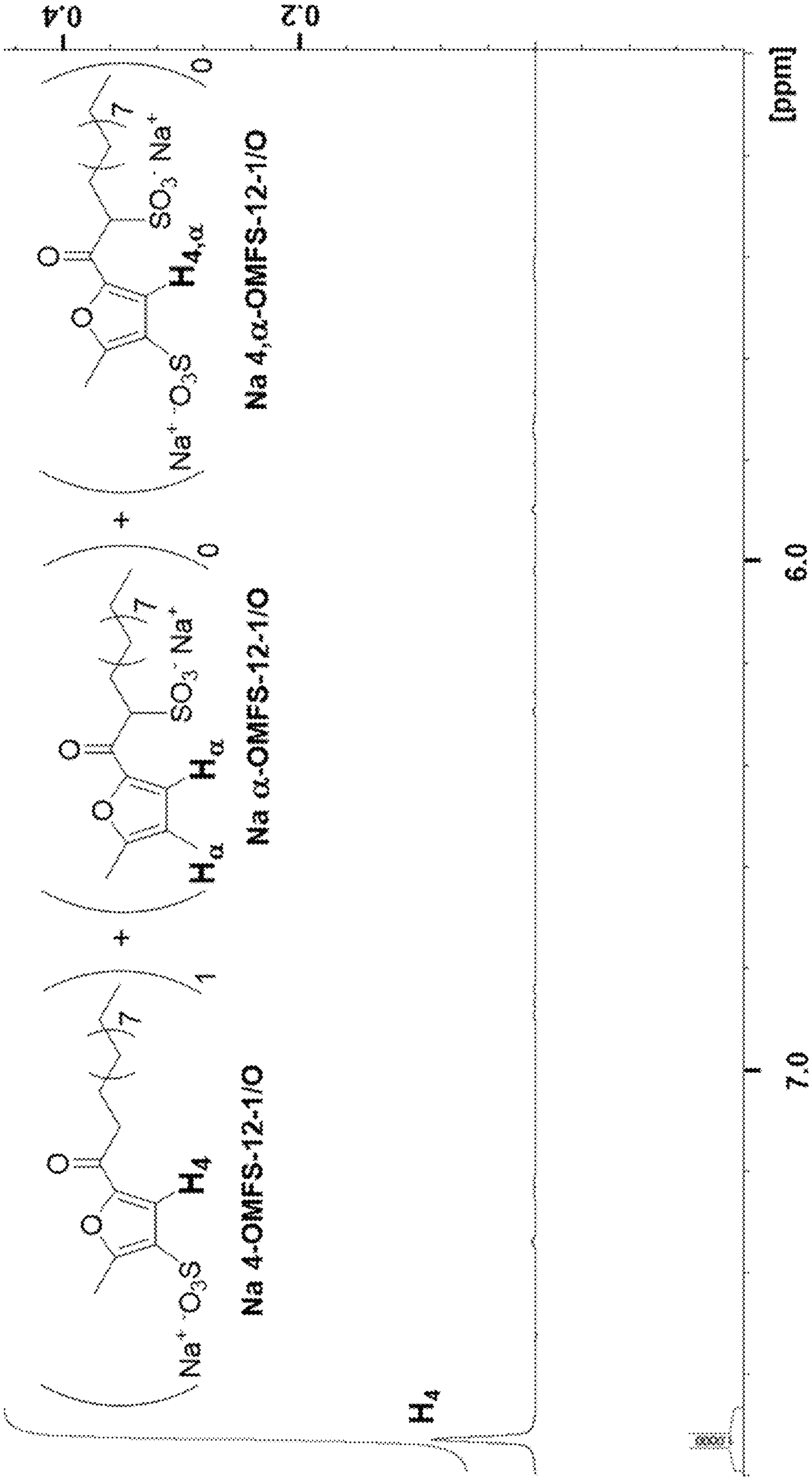
FIG. 7 illustrates a $^1$H NMR spectra of sodium surfactant after neutralization with sodium hydroxide to a pH of 8 and plotting the aromatic proton signal region and the specific proton signal corresponding to the Na 4-OMFS-12-1/O surfactant species.

FIG. 7 illustrates $^1$H NMR spectra of sodium surfactant produced by an embodiment per Example 5 after neutralization with sodium hydroxide to a pH of 8, showing the aromatic proton signal region and the specific proton signal corresponding to the Na 4-OMFS-12-1/O surfactant species.

Example 6

Example 6 describes method embodiments for equimolar selectivity to 4-OMFS and 4,α-OMFS surfactant ($C_{12}$ alkyl chain) embodiments.

Oleum (20 mL, 20 wt % $SO_3$) in the absence of solvent (neat) was cooled to 0° C. and 4 g dodecanoylfuran was added with stirring to provide a SO3 to dodecanoylfuran molar ratio of 6.4:1. Immediately after oleum addition, the reaction was heated to 50° C. and allowed to stir for 0.5 hours. The reaction was then quenched by addition of 35 reaction wt % deionized water. The percent molar distribution of 4-OMFS, α-OMFS, and 4,α-OMFS products as determined by $^1$H NMR was 50:0:50. The total reaction yield was 2%. The reaction scheme representing this method, including oleo-furan reagent(s) and reaction conditions used as well as product distribution, can be seen in Scheme 11.

Scheme 11

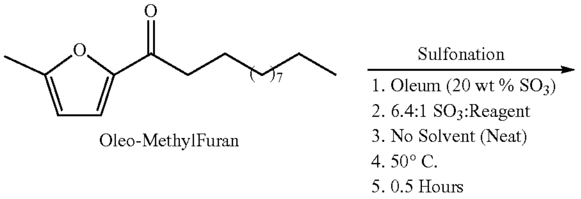

Oleo-MethylFuran

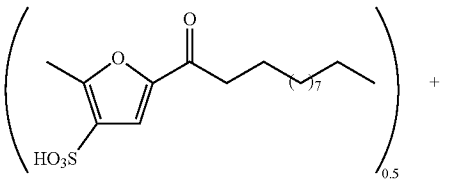
4-OMFS-12-1/O Acid

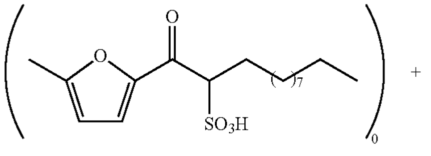
α-OMFS-12-1/O Acid

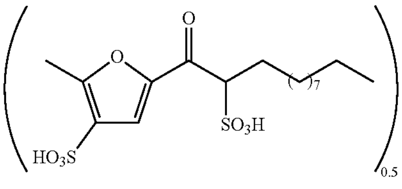
4,α-OMFS-12-1/O Acid

Scheme 11 illustrates reaction conditions and oleo-furan sulfonic acid product distribution for an embodiment per Example 6.

Example 7

Example 7 describes method embodiments for primary selectivity to 4,α-OMFS surfactant (Cis alkyl chain) embodiments.

A 0.16 M solution of octadecanoylmethylfuran in chloroform (4 g in 100 mL) was prepared and heated to 60° C., to which $SO_3$•dimethylformamide was added in a mole ratio of 2:1 sulfonating agent to dodecanoylfuran. The reaction was allowed to stir for 72 hours, after which time the reaction was quenched with 100 reaction wt % deionized water. The percent molar distribution of 4-OMFS, α-OMFS, and 4,α-OMFS products as determined by $^1H$ NMR was 5:5:90. The total reaction yield was 70%. The reaction scheme representing this method, including oleo-furan reagent(s) and reaction conditions used as well as product distribution, can be seen in Scheme 12.

Scheme 12

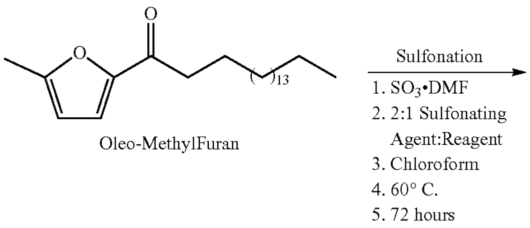

Oleo-MethylFuran

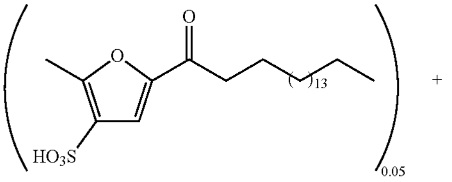
4-OMFS-12-1/O Acid

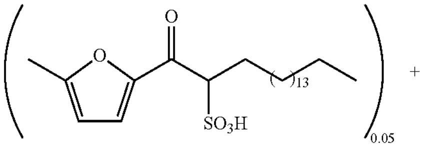
α-OMFS-12-1/O Acid

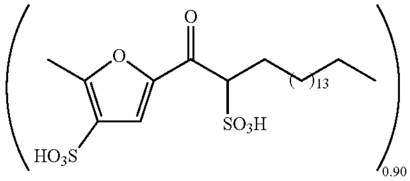
4,α-OMFS-12-1/O Acid

Scheme 12 illustrates reaction conditions and oleo-furan sulfonic acid product distribution for an embodiment per Example 7.

Example 8

Example 8 describes an embodiment relating to preparation of an EFS surfactant blend.

A 0.37 M solution of dodecanoylfuran in acetonitrile was prepared and heated to 40° C., after which time SO3•pyridine was added in a mole ratio of 2:1 sulfonating agent to dodecanoylmethylfuran. Sulfuric acid is then added in a mole ratio of 0.05:1 sulfonating agent to dodecanoylmethylfuran, and the reaction is allowed to stir for 72 hours, after which time the reaction was quenched with 100 reaction wt % deionized water. The percent molar distribution of 4-OMFS, α-OMFS, and 4,α-OMFS products as determined by $^1H$ NMR was 15:80:5. The total surfactant yield was 26%. The reaction scheme representing this method, including oleo-furan reagent(s) used and product distribution, can be seen in Scheme 13. The sodium-OFS surfactant blend yielded by neutralization of the sulfonation acids produced by this method with sodium hydroxide solution to a pH of 8 can be seen in FIG. 8, and the properties of this blend are reported in Table 1.

Scheme 13

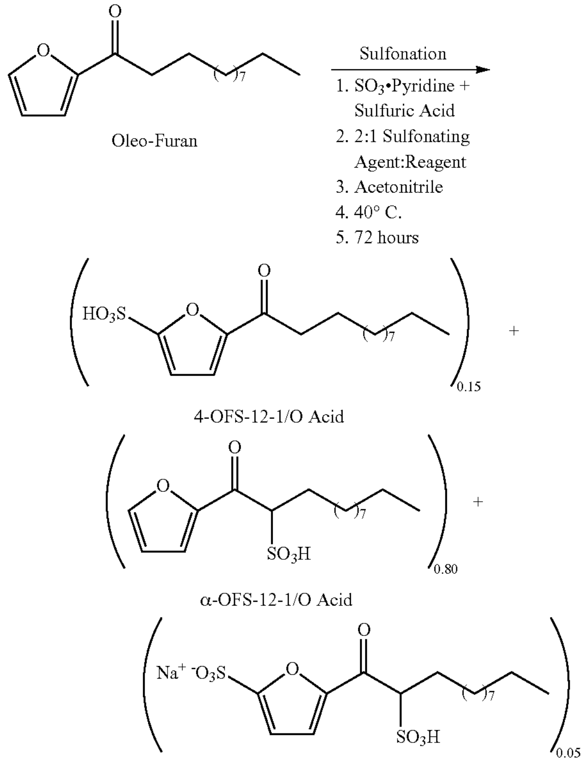

Oleo-Furan

4-OFS-12-1/O Acid

α-OFS-12-1/O Acid

4,α-OFS-12-1/O Acid

Scheme 13 illustrates reaction conditions and oleo-furan sulfonic acid product distribution for an embodiment per Example 8.

Figure 8:
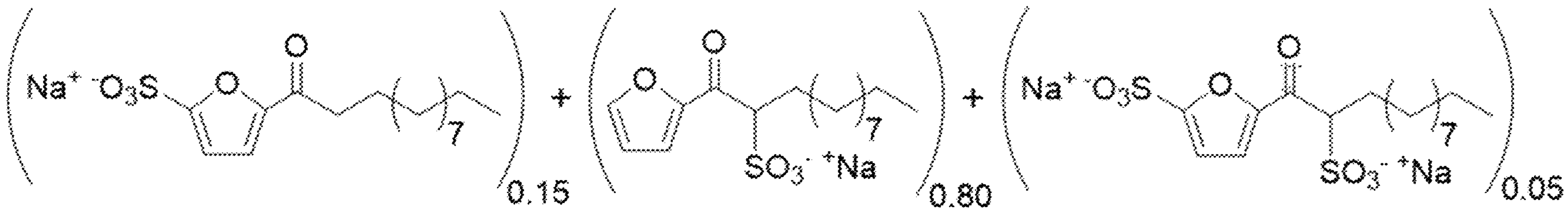
FIG. 8 illustrates oleo-furan surfactants formed from neutralization of sulfonic acids produced from methods disclosed herein using a sodium hydroxide solution to achieve a final pH of 8.

FIG. 8 illustrates oleo-furan surfactants formed from neutralization of sulfonic acids produced from methods detailed in Example 8 using a sodium hydroxide solution to achieve a final pH of 8.

Example 9

Example 9 describes an embodiment relating to sulfonation of an oleo-furan mixture derived from a coconut fatty acid blend.

A solution containing 0.091 M dodecanoylmethylfuran, 0.04 M tetradecanoylmethylfuran, and 0.018 M hexadecanoylmethylfuran representative of a mid-cut blend of fatty acids from fractionated coconut oil dissolved in acetonitrile was prepared and heated to 40° C., after which time $SO_3$•pyridine was added in a mole ratio of 2:1 sulfonating agent to alkanoylfuran (total molar loading of dodecanoylmethylfuran, tetradecanoylmethylfuran, and hexadecanoylmethylfuran). Sulfuric acid is then added in a mole ratio of 0.05:1 sulfonating agent to dodecanoylmethylfuran, and the reaction was allowed to stir for 72 hours, then the reaction was quenched by adding a mass of deionized water equal to 100%. The percent molar distribution of 4-OMFS, α-OMFS, and 4,α-OMFS products as determined by $^1H$ NMR was 24:76:0. The total reaction yield was 42%. The reaction scheme representing this method, including oleo-furan reagent(s) and reaction conditions used as well as product distribution, can be seen in Scheme 14.

Scheme 14

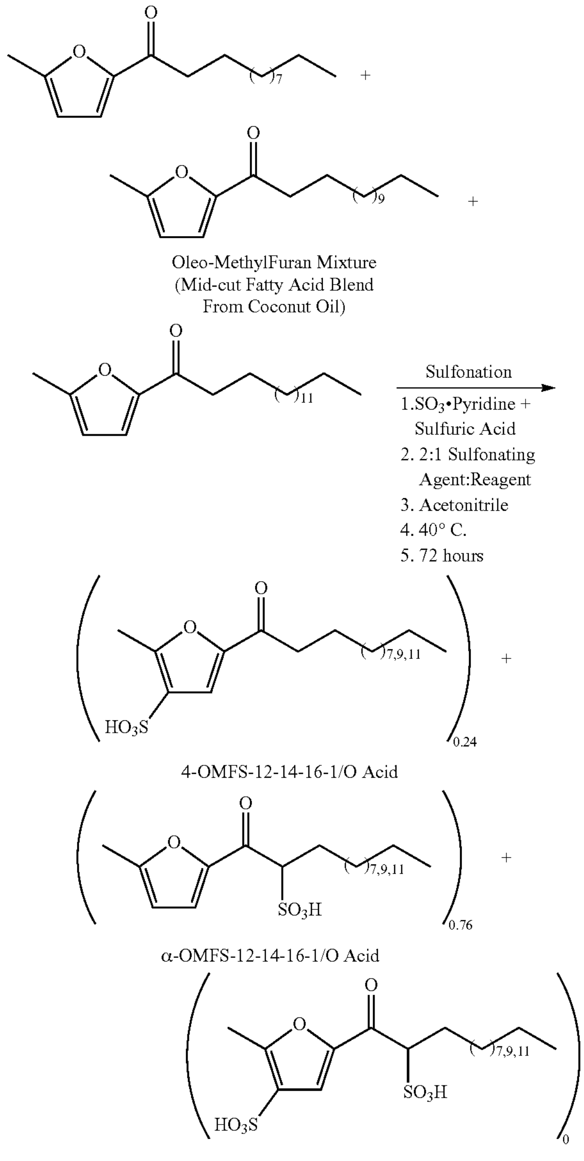

Oleo-MethylFuran Mixture (Mid-cut Fatty Acid Blend From Coconut Oil)

4-OMFS-12-14-16-1/O Acid

α-OMFS-12-14-16-1/O Acid

4,α-OMFS-12-14-16-1/O Acid

Scheme 14 illustrates reaction conditions and oleo-furan sulfonic acid product distribution for an embodiment per Example 9.

Example 10

Example 10 describes an embodiment relating to sulfonation of oleo-furans using a sub-stoichiometric loading of sulfonating agent ($C_{12}$ alkyl chain).

g of dodecanoylmethylfuran was heated to 60° C. in a jacketed flask in the absence of solvent (neat), to which oleum (1.6 mL, 20 wt % h SO3) was added dropwise with stirring to provide a $SO_3$ to dodecanoylmethylfuran molar ratio of 0.5:1. Immediately after oleum addition, after which time the reaction was quenched by adding a mass of deionized water equal to 75% of the reaction mass. The percent molar distribution of 4-OMFS, α-OMFS, and 4,α-OMFS products as determined by $^1H$ NMR was 78:16:6. The total reaction yield was 9%. The reaction scheme representing this method, including oleo-furan reagent(s) and reaction conditions used as well as product distribution, can be seen in Scheme 15.

Scheme 15

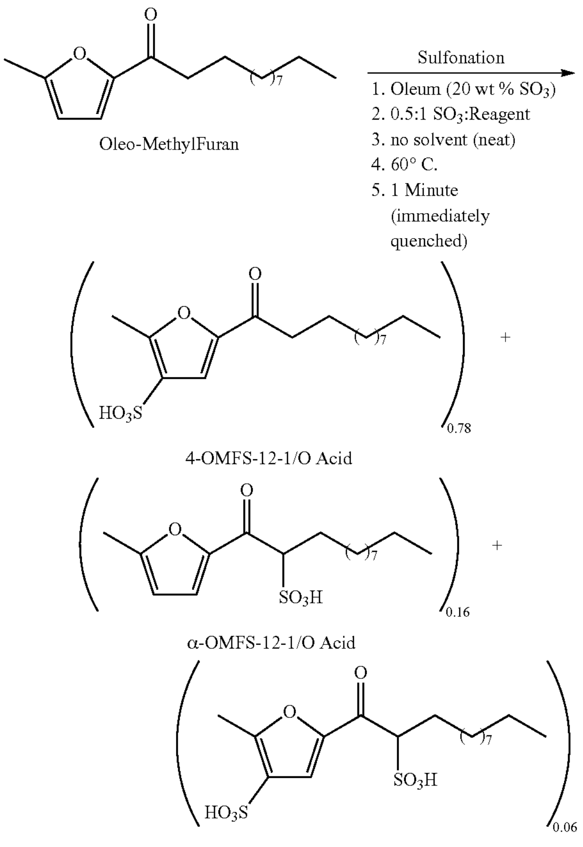

Oleo-MethylFuran

4-OMFS-12-1/O Acid

α-OMFS-12-1/O Acid

4,α-OMFS-12-1/O Acid

Scheme 15 illustrates reaction conditions and oleo-furan sulfonic acid product distribution for an embodiment per Example 10.

Examples 11-13, described below, disclose the impact of solvent selection on the sulfonation of oleo-furans with oleum sulfonating agent (20 wt % free $SO_3$); all other reaction conditions were held constant. As can be seen below, incorporating a solvent (compared to neat reactions) and solvent selection resulted in notable differences in both surfactant selectivity and yield, suggesting solvent effects play an important role in moderating solubility, reactivity, heat transfer and proton conductivity during oleo-furan sulfonation.

Example 11

Example 11 describes an embodiment relating to oleum sulfonation with acetonitrile solvent.

A 0.19 M solution of dodecanoylmethylfuran in acetonitrile solvent was heated to 25° C., to which oleum (1.6 mL, 20 wt % $SO_3$) was added dropwise with stirring to provide a $SO_3$ to dodecanoylmethylfuran molar ratio of 1:1. The reaction was allowed to stir for 1 hour, after which time the reaction was quenched by adding a mass of deionized water equal to 60% of the reaction mass. The percent molar distribution of 4-OMFS, α-OMFS, and 4,α-OMFS products as determined by $^1$H NMR was 34:43:23. The total reaction yield was 68%. The reaction scheme representing this method, including oleo-furan reagent(s) and reaction conditions used as well as product distribution, can be seen in Scheme 16. The sodium-OFS surfactant blend yielded by neutralization of the sulfonation acids produced by this method with sodium hydroxide solution to a pH of 7.6 can be seen in FIG. 9, and the properties of this blend are reported in Table 1.

Scheme 16

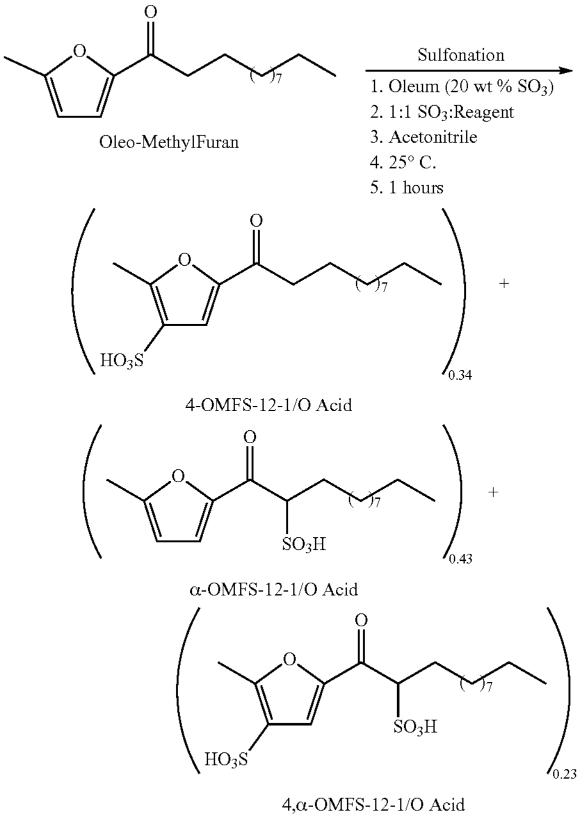

Oleo-MethylFuran

4-OMFS-12-1/O Acid

α-OMFS-12-1/O Acid

4,α-OMFS-12-1/O Acid

Scheme 16 illustrates reaction conditions and oleo-furan sulfonic acid product distribution for an embodiment per Example 11.

Figure 9:
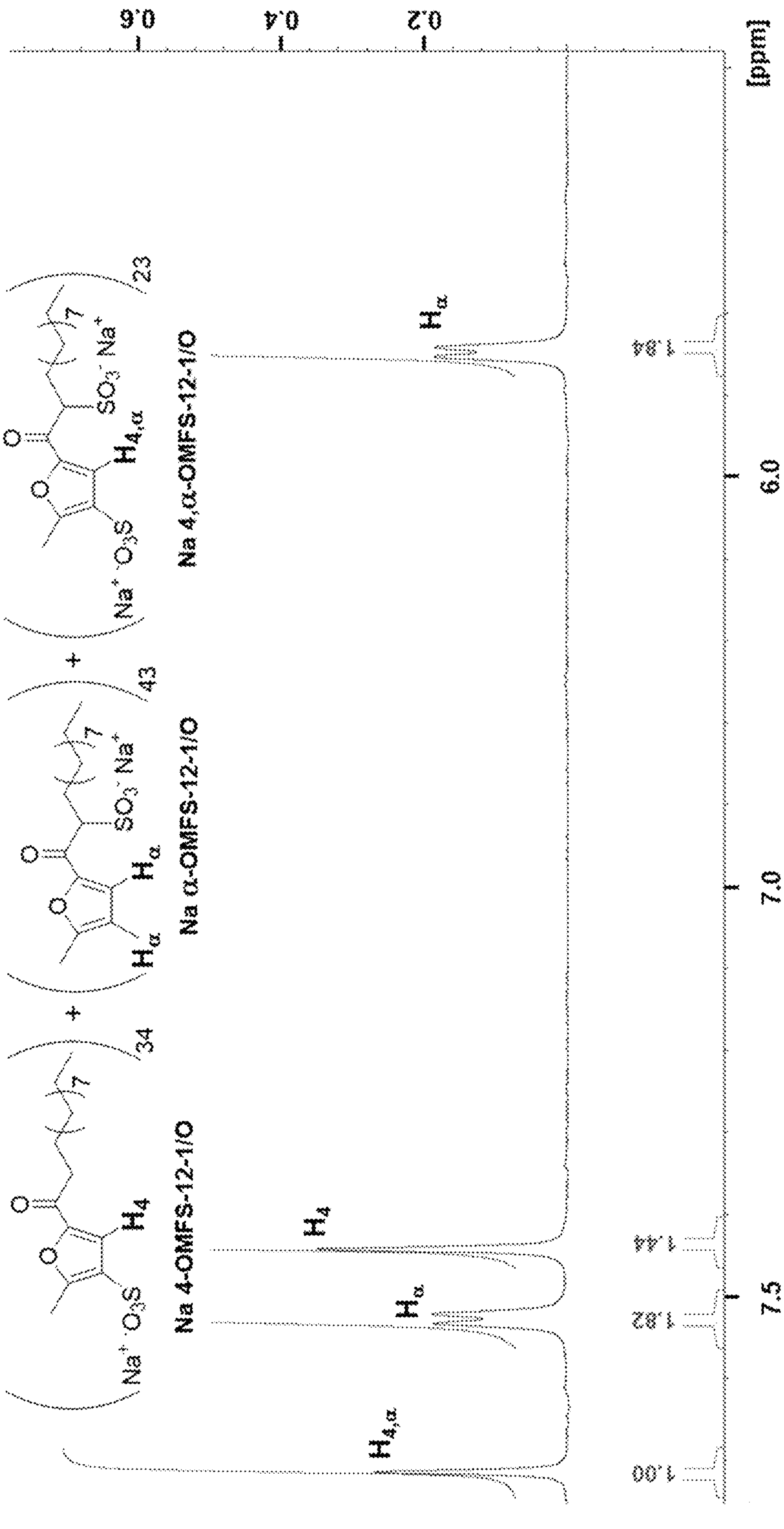
FIG. 9 illustrates a $^1$H NMR spectra of sodium surfactant after neutralization with sodium hydroxide to a pH of 7.6 and plotting the aromatic proton signal region and the specific proton signals corresponding to individual sulfonate species in the blend.

FIG. 9 illustrates $^1$H NMR spectra of sodium surfactant produced per Example 11 after neutralization with sodium hydroxide to a pH of 7.6, showing the aromatic proton signal region and the specific proton signals corresponding to individual sulfonate species in the blend.

Example 12

Example 12 describes an embodiment relating to oleum sulfonation with heptane solvent.

A 0.19 M solution of dodecanoylmethylfuran in heptane solvent was heated to 25° C., to which oleum (1.6 mL, 20 wt % $SO_3$) was added dropwise with stirring to provide a $SO_3$ to dodecanoylmethylfuran molar ratio of 1:1. The reaction was allowed to stir for 1 hour, after which time the reaction was quenched by adding a mass of deionized water equal to 60% of the reaction mass. The percent molar distribution of 4-OMFS, α-OMFS, and 4,α-OMFS products as determined by $^{1}H$ NMR was 85:10:5. The total reaction yield was 21%. The reaction scheme representing this method, including oleo-furan reagent(s) and reaction conditions used as well as product distribution, can be seen in Scheme 17.

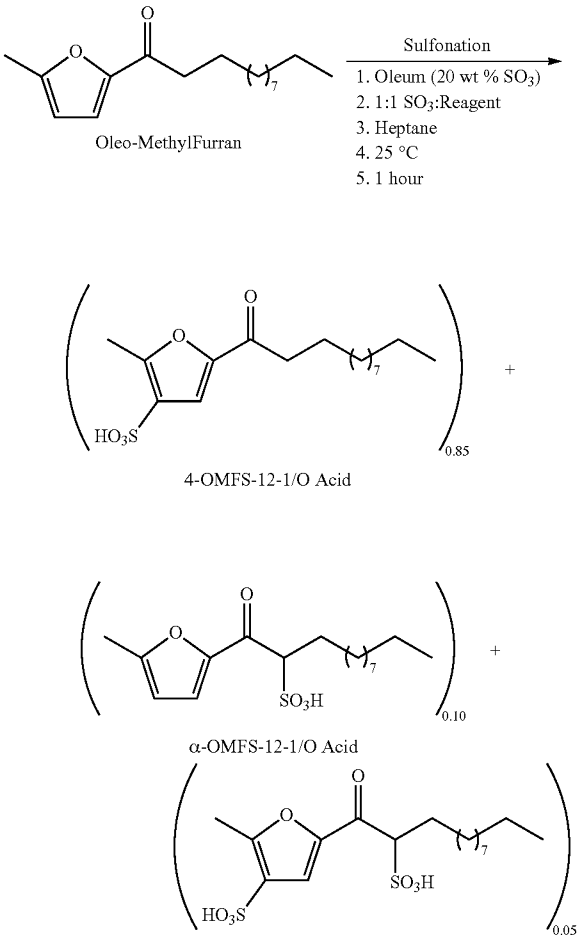

Oleo-MethylFurran

4-OMFS-12-1/O Acid

α-OMFS-12-1/O Acid

4,α-OMFS-12-1/O Acid

Scheme 17 illustrates reaction conditions and oleo-furan sulfonic acid product distribution for an embodiment per Example 12.

Example 13

Example 13 describes an embodiment relating to oleum sulfonation with chloroform solvent.

A 0.19 M solution of dodecanoylmethylfuran in chloroform solvent was heated to 25° C., to which oleum (1.6 mL, 20 wt % $SO_3$) was added dropwise with stirring to provide a $SO_3$ to dodecanoylmethylfuran molar ratio of 1:1. The reaction was allowed to stir for 1 hour, after which time the reaction was quenched by adding a mass of deionized water equal to 45% of the reaction mass. The percent molar distribution of 4-OMFS, α-OMFS, and 4,α-OMFS products as determined by $^{1}H$ NMR was 74:21:5. The total reaction yield was 14%. The reaction scheme representing this method, including oleo-furan reagent(s) and reaction conditions used as well as product distribution, can be seen in Scheme 18.

Scheme 18

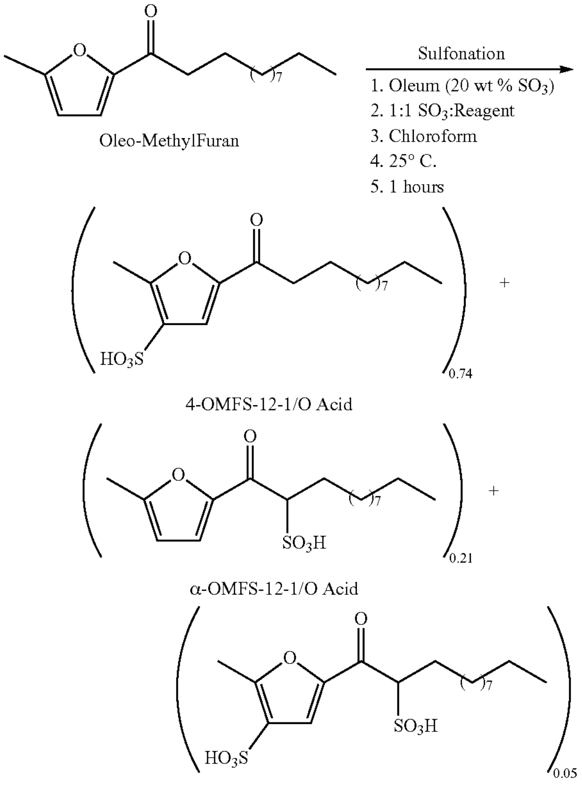

Oleo-MethylFuran

4-OMFS-12-1/O Acid

α-OMFS-12-1/O Acid

4,α-OMFS-12-1/O Acid

Scheme 18 illustrates reaction conditions and oleo-furan sulfonic acid product distribution for an embodiment per Example 13.

Example Performance Quantifications

Certain surfactant properties and performance metrics of synthesized surfactants structures according to General Structure 1 (GS1), including several exemplary surfactant blends prepared according to the methods disclosed previously herein, were measured. These results are shown in Table 1 below, and include the time required for the surfactant solution to wet cotton fabric, the amount of foam the surfactant generates when agitated (either poured or exposed to high shear), the surfactant's solubility which can impact the potential loading in product formulations, the temperature below which the surfactant forms a solid precipitate (e.g., Krafft Point), and for some surfactants the critical micelle concentration and surface tension. These provided results demonstrate notable differences in performance as a function of the number and position(s) of sulfonate functional groups added to the oleo-furan compound during the sulfonation process. For example, the α-OMFS-12-1/O surfactant with a sulfonate on the surfactant's alkyl chain provides faster wetting kinetics, as compared to the ring sulfonate 4-OMFS-12-1/O which has slower fabric wetting kinetics yet generates more foam in high shear conditions, or the disulfonate surfactant sulfonated on both the ring and alkyl chain (4,α-OMFS-12-1/O) which has slower fabric wetting and generates less foam than either of the aforementioned monosulfonates surfactants, yet has a higher solubility that can be helpful in building product formulations. Accordingly, these differing performance metrics can be leveraged by selecting the particular disclosed surfactant structure corresponding to the performance metrics useful in a specific application of the surfactant structure.

One particularly notable finding during property testing of surfactant embodiments disclosed herein was discovery of a synergistic effect for combinations of the 3 sulfonation types: ring sulfonation, alkyl chain sulfonation, and combined ring & chain disulfonation. Referencing Table 1 produced below, the surfactant blend prepared according to Example 1 (Scheme 6), for example, after neutralization of the formed sulfonic acids with sodium hydroxide (FIG. 1), with a molar ratio of 0.48:0.43:0.09 for the 4-:α-:4,α-OMFS-12-1/O surfactants, has properties and performance metrics that exceed those of its individual components. The fabric wetting time recorded for this blend was 8 seconds, a faster wetting time than the fastest of the three surfactant components (α-OMFS-12-1/O, 18 seconds). Similarly, this surfactant blend was observed to yield higher pour foam (150 mm) than any component surfactant (highest individual 140 mm for α-OMFS-12-1/O), which is particularly notable given that nearly 10 mole % of this blend's composition is the disulfonate surfactant (4,α-OMFS-12-1/O) which generates significantly less foam. These results indicate the properties and performance of oleo-furan sulfonate surfactant blends are not additive, but synergistic and unique to the composition of the blend.

The impact of cation selection on the properties and performance of surfactant blends can be observed by comparison of properties for the sodium-, calcium-, and magnesium-neutralized sulfonic acids prepared according to Example 1. The sodium and calcium surfactant blends have similar fabric wetting kinetics, cold water solubility (Krafft point <0° C.) and foam generation from pouring; however, the calcium surfactant blend has a significantly lower critical micelle concentration, allowing for micelle formation at less than a third of the surfactant loading of the sodium surfactant (250 ppm for calcium vs. 800 ppm for sodium). The sodium surfactant blend was also observed to generate more foam with high shear agitation compared to the sodium surfactant. The magnesium surfactant blend was distinct from both its sodium and calcium counterparts in numerous properties, including a lower solubility (Krafft point of 25° C.), slower wetting kinetics, and lower foam generation with high shear agitation. The magnesium surfactant blend generated more foam from pour testing than either the sodium or calcium blends; this pour foam generation exceeded every other individual surfactant and surfactant blend tested.

The sodium surfactant blends formed by sulfonation and subsequent neutralization of dodecanoylfuran (Example 8) contained a different ratio of the sulfonate product compositions (4-OFS, α-OFS, and 4,α-OFS) compared to the surfactant blends prepared from dodecanoylmethylfuran (FIG. 8); however, multiple properties were similar between the sodium OMFS-blend and the sodium OFS-blend surfactants. Cold water solubility and foam generation were similar for the sodium surfactant blends, while critical micelle concentration and fabric wetting kinetics both differed significantly. These differences may be due to either the difference in chemical compositions from an oleo-furan vs. an oleo-methylfuran feedstock, or the difference in ratio of the formed sulfonic acids that are neutralized to make the surfactant blend, or possibly a combination of both.

Preparation of oleo-furan surfactants with higher carbon content, such as using oleo-furan feedstocks prepared from longer alkyl chain fatty acids including tetradecanoylmethylfuran, hexadecanoylmethylfuran, octadecanoylmethylfuran, or mixtures thereof, have generally been found to have a higher carbon content than is beneficial for surfactant performance due to a poor hydrophilic-lipophilic balance (HLB). Compared to the lauric acid-based oleo-furans (e.g., dodecanoylmethylfuran), the oleo-furan feedstocks sourced from longer alkyl chain fatty acids are excessively lipophilic, and as a result tend to exhibit lower foam generation upon agitation as well as lower cold-water solubility (higher Krafft point). The methods outlined above that enable control over the number of sulfonate groups per surfactant molecule have allowed for the design of oleo-furan sulfonate surfactant molecules with higher carbon content (alkyl chain lengths of $C_{14}$, $C_{16}$, and $C_{18}$ corresponding to Exemplary Structures 3, 4 and 5, respectively) that have additional sulfonate groups added to balance the HLB and retain preferred surfactant characteristics. For example, the disulfonate surfactants of Structures B2-2, B2-3, and B2-4, which contain a higher carbon content, still exhibit the high pour foam generation that is useful for surfactants in personal care applications, as well as cold-water solubility (Krafft points <0° C.) that is desired for sustainable detergency applications. These disulfonate surfactants by many metrics perform similarly to the monoanionic surfactants with a lower carbon content (e.g., 4-MFS-12-1/0), which allows for use of a wider range of fatty acid feedstocks with higher carbon content in the surfactant manufacturing process than is generally acceptable for use in anionic surfactants (e.g., sulfated fatty alcohols).

TABLE 1

| Surfactant or Surfactant Blend | CMC[1] (ppm) | Surface Tension[2] (mN/m) | Pour Foam Height[3] (mm) | High Shear Foam Height[4] (mm) | Wetting Time[5] (sec) | Solubility[6] (g/mL) | Krafft Point (° C.) |
|---|---|---|---|---|---|---|---|
| $Na^+$ 4-OMFS-12-1/0 (n = 12)* | 1480 | 42 | 134/132 | 71/69 | 48 | 0.8 | <0 |
| $Na^+$ α-OMFS-12-1/0 (n = 12)* Structure A2-1 | — | — | 140/135 | 65/65 | 18 | 0.8 | <0 |
| $Na^+$ 4,α-OMFS-12-1/0 (n = 12)* Structure B2-1 | — | — | 75/35 | 25/15 | >300 | 0.9 | <0 |
| $Na^+$ 4,α-OMFS-14-1/0 (n = 14)* Structure B2-2 | — | — | 155/145 | 53/50 | >300 | 0.6 | <0 |
| $Na^+$ 4,α-OMFS-16-1/0 (n = 16)* Structure B2-3 | — | — | 160/150 | 40/40 | 120 | 0.8 | <0 |
| $Na^+$ 4,α-OMFS-18-1/0 (n = 18)* Structure B2-4 | — | — | 130/125 | 40/40 | 141 | — | <0 |
| $NH_4^+$ 4,α-OMFS-12-1/0 (n = 12)* Structure B1-1 | 3545 | 39 | 60/40 | 37/31 | >300 | 0.5 | <0 |
| $Ca^{2+}$ 4,α-OFS-12-1/0 (n = 12)* Structure B3-1 | — | — | 70/60 | 51/48 | >300 | — | <0 |

TABLE 1-continued

| Surfactant or Surfactant Blend | CMC[1] (ppm) | Surface Tension[2] (mN/m) | Pour Foam Height[3] (mm) | High Shear Foam Height[4] (mm) | Wetting Time[5] (sec) | Solubility[6] (g/mL) | Krafft Point (° C.) |
|---|---|---|---|---|---|---|---|
| $Na^+$ OMFS-Blend (n = 12)* Method Example 1 + NaOH | 800 | 32 | 150/145 | 71/70 | 8 | 0.9 | <0 |
| $Ca^{2+}$ OMFS-Blend (n = 12)* Method Example 1 + $Ca(OH)_2$ | 250 | 34 | 150/140 | 50/50 | 7 | 0.4 | <0 |
| $Mg^{2+}$ OMFS-Blend (n = 12)* Method Example 1 + $Mg(OH)_2$ | — | 38 | 185/175 | 43/41 | 22 | <0.1 | 25 |
| $Na^+$ OFS-Blend (n = 12)* Method Example 8 + NaOH | 1735 | 44 | 134/118 | 68/68 | 34 | — | <0 |

[1]Critical micelle concentration
[2]Surface tension at critical micelle concentration
[3]Height of foam immediately after foam formation and after 5 minutes (20° C.), performed according to ASTM D1173
[4]Height of foam immediately after foam formation and after 5 minutes (20° C.), performed according to ASTM D3519
[5]Wetting of cotton skein at 30° C. (TestFabrics) according to ASTM D2281
[6]Solubility in deionized water at 20° C.
*Here n is defined as the total number of carbon atoms in the alkyl chain of the oleo-furan surfactant Various examples have been described with reference to certain disclosed embodiments. The embodiments are presented for purposes of illustration and not limitation. One skilled in the art will appreciate that various changes, adaptations, and modifications can be made without departing from the scope of the invention.

What is claimed is:

1. A compound having the formula (1)

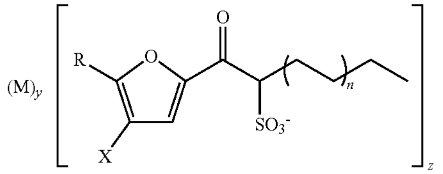

wherein M is a cation selected from the group consisting of: $NH_4$+, $Li^+$, $Ca^{2+}$, $Na^+$, and $Mg^{2+}$,
wherein R and X are selected from the group consisting of: H, $CH_3$, other alkyl substituents, and $SO_3^-$,
wherein y is selected from the group consisting of 1 and 2, and non-integer values between 1 and 2,
wherein z is selected from the group consisting of 1 and 2, and non-integer values between 1 and 2, and
wherein n is an alkyl chain from 4 to 28 carbon atoms in length.

2. The compound of claim 1, wherein M is $Na^+$, y is 2, and z is 1.

3. The compound of claim 1, wherein M is $Ca^{2+}$ and both y and z are 1.

4. The compound of claim 1, wherein M is $NH_4^+$, y is 2, and z is 1.

5. The compound of claim 1, wherein M is a mixture of $Na^+$ and $Ca^{2+}$, y is a non-integer value between 1 and 2, and z is 1.

6. The compound of claim 1, wherein n is 7, with 18 total carbon atoms in the alkyl chain.

7. The compound of claim 1, wherein a mixture of alkyl chain carbon contents is present ranging from n=1 to n=7 with between 6 and 18 total carbon atoms in the alkyl chain, reflecting sourcing feedstocks from natural oils which are comprised of the mixture of alkyl chain carbon contents.

8. The compound of claim 1, wherein R is $CH_3$ and X is $SO_3^-$.

9. The compound of claim 8, wherein the compound is:

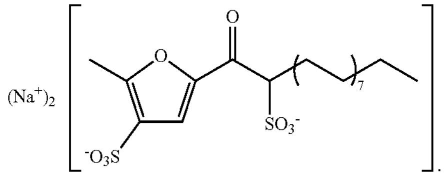

10. The compound of claim 8, wherein the compound is:

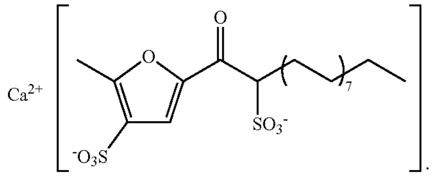

11. The compound of claim 8, wherein the compound is:

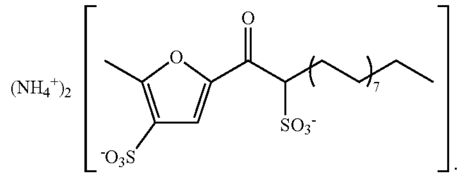

12. The compound of claim 1, wherein M is $Na^+$ and both y and z are 1.

13. The compound of claim 1, wherein M is $Ca^{2+}$, y is 1, and z is 2.

14. The compound of claim 1, wherein M is $NH_4^+$, and both y and z are 1.

15. The compound of claim 1, wherein M is a mixture of $Na^+$ and $Ca^{2+}$, y is a non-integer value between 1 and 2, and z is a non-integer value between 1 and 2.

16. The compound of claim 1, wherein n is 4, with 12 total carbon atoms in the alkyl chain.

17. The compound of claim 1, wherein n is 5, with 14 total carbon atoms in the alkyl chain.

18. The compound of claim 1, wherein R is $CH_3$, X is H.

19. The compound of claim 18, wherein the compound is:
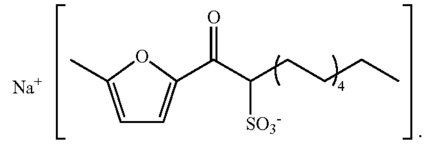
20. The compound of claim 18, wherein the compound is:
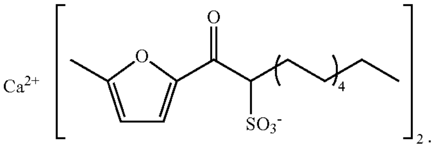
* * * * *